US008676216B2

(12) United States Patent
Zhou et al.

(10) Patent No.: US 8,676,216 B2
(45) Date of Patent: Mar. 18, 2014

(54) METHOD AND APPARATUS FOR MITIGATING INTERFERENCE IN FEMTOCELL DEPLOYMENTS

(75) Inventors: Yan Zhou, San Diego, CA (US); Farhad Meshkati, San Diego, CA (US); Vinay Chande, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 13/171,091

(22) Filed: Jun. 28, 2011

(65) Prior Publication Data

US 2011/0319088 A1 Dec. 29, 2011

Related U.S. Application Data

(60) Provisional application No. 61/359,762, filed on Jun. 29, 2010, provisional application No. 61/387,359, filed on Sep. 28, 2010.

(51) Int. Cl.
*H04W 36/00* (2009.01)
(52) U.S. Cl.
USPC .......... 455/444; 455/522; 455/501; 455/63.1; 370/395.4
(58) Field of Classification Search
USPC ................ 455/522, 501, 63.1; 370/395.4
See application file for complete search history.

(56) References Cited

U.S. PATENT DOCUMENTS

| 7,647,065 | B2* | 1/2010 | Au et al. ............ 455/522 |
| 7,668,561 | B2* | 2/2010 | Au et al. ............ 455/522 |
| 8,031,686 | B2* | 10/2011 | Li et al. ............ 370/342 |
| 2004/0228349 | A1* | 11/2004 | Vrzic et al. ......... 370/395.4 |
| 2004/0258035 | A1* | 12/2004 | Fan et al. ........... 370/342 |
| 2005/0192042 | A1* | 9/2005 | Au et al. ............ 455/522 |
| 2006/0045045 | A1 | 3/2006 | Blessent et al. | |

(Continued)

FOREIGN PATENT DOCUMENTS

EP          2152041 A1    2/2010
WO     2009025595 A1    2/2009

OTHER PUBLICATIONS

3rd Generation Partnership Project; Technical Specification Group Radio Access Networks; FDD Home NodeB RF Requirements Work Item Technical Report (Release 8), 3GPP Standard; 3GPP TR 25.967, 3rd Generation Partnership Project (3GPP), Mobile Competence Centre ; 650, Route Des Lucioles ; F-06921 Sophia-Antipolis Cedex ; France, No. 2.0.0, Feb. 1, 2009, pp. 1-58, XP05038087.

(Continued)

*Primary Examiner* — Charles Shedrick

(57) ABSTRACT

Methods and apparatuses are provided for determining one or more parameters of an access point that can be set or adjusted to mitigate interference to other access points. A rise-over-thermal (RoT) threshold can be set at an access point based on one or more parameters, such as pathloss measurements, location of the access point, etc., such that interference from devices communicating with the access point can be mitigated. In addition, a noise floor, RoT threshold, etc., can be adjusted based on determining a transmit power difference, out-of-cell interference, and/or similar measurements.

28 Claims, 18 Drawing Sheets

(56) References Cited

U.S. PATENT DOCUMENTS

| | | | |
|---|---|---|---|
| 2006/0233110 A1* | 10/2006 | Yang et al. | 370/237 |
| 2008/0004031 A1 | 1/2008 | Rong et al. | |
| 2008/0032734 A1* | 2/2008 | Au et al. | 455/522 |
| 2008/0039129 A1* | 2/2008 | Li et al. | 455/522 |
| 2010/0167778 A1* | 7/2010 | Raghothaman et al. | 455/522 |
| 2010/0220601 A1* | 9/2010 | Vermani et al. | 370/248 |
| 2012/0258746 A1* | 10/2012 | Tokgoz et al. | 455/501 |
| 2012/0329399 A1* | 12/2012 | Tokgoz et al. | 455/63.1 |

OTHER PUBLICATIONS

International Search Report and Written Opinion—PCT/US2011/042464—ISA/EPO—Dec. 21, 2011.

* cited by examiner

METHOD AND APPARATUS FOR MITIGATING INTERFERENCE IN FEMTOCELL DEPLOYMENTS

CLAIM OF PRIORITY UNDER 35 U.S.C. §119

The present Application for Patent claims priority to Provisional Application No. 61/359,762 entitled "ADAPTIVE RISE-OVER-THERMAL (ROT) THRESHOLD AND NOISE FLOOR ADJUSTMENT FOR FEMTOCELL UPLINK INTERFERENCE MANAGEMENT" filed Jun. 29, 2010, and assigned to the assignee hereof and hereby expressly incorporated by reference herein, as well as Provisional Application No. 61/387,359 entitled "ADAPTIVE RISE-OVER-THERMAL (ROT) THRESHOLD AND NOISE FLOOR ADJUSTMENT FOR FEMTOCELL UPLINK INTERFERENCE MANAGEMENT" filed Sep. 28, 2010, and assigned to the assignee hereof and hereby expressly incorporated by reference herein.

BACKGROUND

1. Field

The following description relates generally to wireless network communications, and more particularly to mitigating interference in femtocell deployments.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more access points via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

To supplement conventional base stations, additional restricted access points can be deployed to provide more robust wireless coverage to mobile devices. For example, wireless relay stations and low power base stations (e.g., which can be commonly referred to as Home NodeBs or Home eNBs, collectively referred to as H(e)NBs, femto access points, femtocells, picocells, microcells, etc.) can be deployed for incremental capacity growth, richer user experience, in-building or other specific geographic coverage, and/or the like. In some configurations, such low power base stations can be connected to the Internet via broadband connection (e.g., digital subscriber line (DSL) router, cable or other modem, etc.), which can provide the backhaul link to the mobile operator's network. Thus, for example, the low power base stations can be deployed in user homes to provide mobile network access to one or more devices via the broadband connection.

In this regard, deployment of such low power base stations is unplanned in many cases, and thus the base stations and/or mobile devices communicating therewith can cause interference to other low power base stations, macrocell base stations, or other devices in the vicinity. Interference mitigation mechanisms exist for low power base stations to set transmission power thereof preventing or lessening interference with other access points. Devices served by the low power access point, however, can still cause interference to the other access points.

SUMMARY

The following presents a simplified summary of one or more aspects in order to provide a basic understanding of such aspects. This summary is not an extensive overview of all contemplated aspects, and is intended to neither identify key nor critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with modifying parameters of a femtocell access point to mitigate interference with one or more other access points in the vicinity. For example, a rise-over-thermal (RoT) threshold can be set for the femtocell access point based at least in part on one or more parameters related to a macrocell within which the femtocell access point communicates to mitigate interference to an access point of the macrocell and/or one or more other femtocell access points. In one example, the RoT threshold can be determined based at least in part on one or more pathloss measurements received from one or more devices communicating with the femtocell access point (e.g., pathloss to the femtocell access point, to one or more macrocell or other femtocell access points, and/or the like). Moreover, in another example, a femtocell access point can increase a noise floor to mitigate interference from one or more other access points or devices communicating therewith (e.g., based at least in part on detecting a signal strength of the one or more other access points, out-of-cell interference etc.).

According to an example, a method for setting a RoT threshold for a femtocell access point is provided. The method includes receiving one or more parameters corresponding to one or more access points, determining a RoT threshold for the femtocell access point based at least in part on the one or more parameters. The method also includes setting the RoT threshold at the femtocell access point.

In another aspect, an apparatus for setting a RoT threshold for a femtocell access point is provided. The apparatus includes at least one processor configured to receive one or more parameters corresponding to one or more access points and determine a RoT threshold for the femtocell access point based at least in part on the one or more parameters. The at least one processor is further configured to set the RoT threshold at the femtocell access point. The apparatus also includes a memory coupled to the at least one processor.

In yet another aspect, an apparatus for setting a RoT threshold for a femtocell access point is provided that includes means for receiving one or more parameters corresponding to one or more access points and means for determining a RoT threshold for the femtocell access point based at least in part on the one or more parameters. The apparatus further includes means for setting the RoT threshold at the femtocell access point.

Still, in another aspect, a computer-program product for setting a RoT threshold for a femtocell access point is provided including a computer-readable medium having code for causing at least one computer to receive one or more parameters corresponding to one or more access points and code for causing the at least one computer to determine a RoT threshold for the femtocell access point based at least in part on the one or more parameters. The computer-readable medium further includes code for causing the at least one computer to set the RoT threshold at the femtocell access point.

Moreover, in an aspect, an apparatus for setting a RoT threshold for a femtocell access point is provided that includes a parameter receiving component for receiving one or more parameters corresponding to one or more access points and a RoT threshold determining component for determining a RoT threshold for the femtocell access point based at least in part on the one or more parameters. The apparatus further includes a RoT threshold setting component for setting the RoT threshold at the femtocell access point.

According to another example, a method for adjusting parameters of an access point based on determining interference is provided. The method includes detecting a strongest transmit power of one or more access points and determining whether the strongest transmit power exceeds a transmit power utilized at a femtocell access point. The method further includes adjusting an estimated noise floor of the femtocell access point based at least in part on whether the strongest transmit power exceeds the transmit power.

In another aspect, an apparatus for adjusting parameters of an access point based on determining interference is provided. The apparatus includes at least one processor configured to detect a strongest transmit power of one or more access points and determine whether the strongest transmit power exceeds a transmit power utilized at a femtocell access point. The at least one processor is further configured to adjust a noise floor of the femtocell access point based at least in part on whether the strongest transmit power exceeds the transmit power. The apparatus also includes a memory coupled to the at least one processor.

In yet another aspect, an apparatus for adjusting parameters of an access point based on determining interference is provided that includes means for detecting a strongest transmit power of one or more access points and means for adjusting a noise floor of a femtocell access point based at least in part on determining whether the strongest transmit power exceeds a transmit power of the femtocell access point.

Still, in another aspect, a computer-program product for adjusting parameters of an access point based on determining interferences is provided including a computer-readable medium having code for causing at least one computer to detect a strongest transmit power of one or more access points and code for causing the at least one computer to determine whether the strongest transmit power exceeds a transmit power utilized at a femtocell access point. The computer-readable medium further includes code for causing the at least one computer to adjust a noise floor of the femtocell access point based at least in part on whether the strongest transmit power exceeds the transmit power.

Moreover, in an aspect, an apparatus for adjusting parameters of an access point based on determining interference is provided that includes an interference determining component for detecting a strongest transmit power of one or more access points and a noise floor adjusting component for adjusting a noise floor of a femtocell access point based at least in part on determining whether the strongest transmit power exceeds a transmit power of the femtocell access point.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
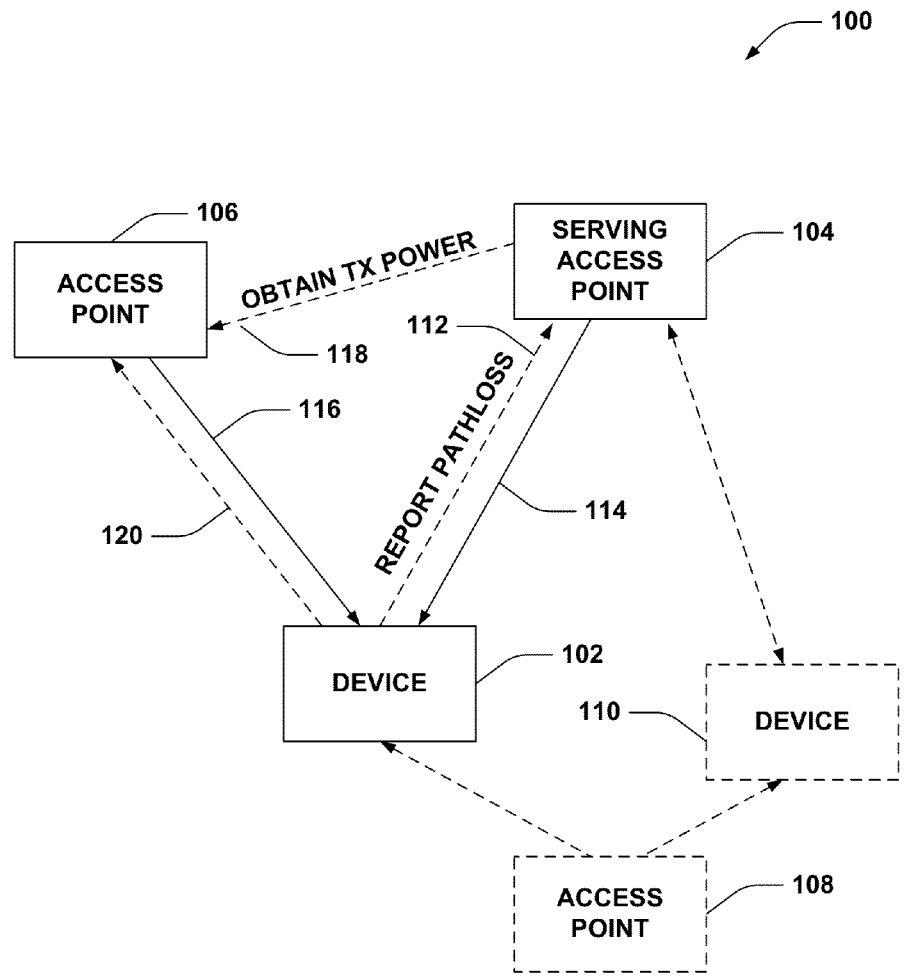
FIG. 1 is a block diagram of an example system that facilitates mitigating interference in a wireless network.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, one or more parameters of a femtocell access point can be set or adjusted to mitigate interference to one or more other access points (e.g., potentially caused by devices communicating with the femtocell access point). For example, a rise-over-thermal (RoT) threshold of the femtocell access point can be set and/or adjusted based on one or more parameters related to an access point within which the femtocell access point communicates. In one example, the one or more parameters can be a pathloss to the femtocell access point, one or more other femtocell access points or macrocell access points, and/or the like. In another example, an estimated noise floor of an access point can be adjusted based on a determined level of interference caused to the access point. In either case, the adjustments can result in modifications to utilized power by devices communicating therewith, which can mitigate interference caused at or caused by one or more access points.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), H(e)NB, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, an example wireless communication system 100 is illustrated that facilitates setting one or more parameters at a serving access point to mitigate interference to other access points. System 100 comprises a device 102 that can communicate with a serving access point 104 to receive access to a wireless network and/or one or more components thereof. System 100 can also comprise other access points 106 and/or 108 with which device 102 can potentially interfere. System 100 also optionally comprises another device 110 that can be served by serving access point 104. For example, device 102 and/or 110 can be a UE, modem (or other tethered device), a portion thereof, and/or the like. Access points 104, 106, and/or 108 can each be a femtocell access point (such as a Home Node B or Home evolved Node B, collectively referred to herein as H(e)NB), picocell access point, microcell access point, a mobile base station, a relay node, a device (e.g., communicating in peer-to-peer or ad-hoc mode), a portion thereof, and/or the like.

According to an example, device 102 can potentially interfere with access point 106 and/or 108 while transmitting signals 112 (whether reporting pathloss or otherwise) to serving access point 104. As described, at least some of serving access point 104, access point 106, and/or access point 108 can be part of a femtocell or other unplanned wireless network deployment, and thus, the access points 104, 106, and/or 108, or devices communicating therewith, can possibly interfere with one another (e.g., where access points are deployed in close proximity). In this regard, for example, serving access point 104 can set or adjust one or more parameters to mitigate the possible interference caused by device 102 and/or other devices.

As described further herein, serving access point 104 can set a RoT threshold based at least in part on one or more communication parameters to mitigate interference to access points 106 and/or 108. In one example, the one or more communication parameters can correspond to pathloss measurements to the access points 106 and/or 108 along with a pathloss to serving access point 104, as computed by device 102, one or more other devices, such as device 110, a network listening module (NLM) of serving access point (not shown), and/or the like. The RoT threshold can additionally be set based at least in part on a determined noise floor at the access points, etc. Thus, for example, device 102 can report pathloss measurements 112 to serving access point 104 based at least in part on computing pathloss to serving access point based on signal 114, pathloss to access point 106 based on receiving signal 116, and/or the like. In another example, the one or more parameters can correspond to parameters from which a pathloss can be determined, such as a received signal code power (RSCP), a common pilot indicator channel (CPICH) transmit power in LTE, and/or the like.

In another example, serving access point and access point 106 (and/or access point 108) can utilize different transmission powers, which can result in device 102 communicating with an access point 104 that operates at a greater distance, but transmits using a higher power than access point 106. In this example, the device 102 can thus interfere with access point 106 when communicating with serving access point 104 at the higher power. To mitigate such interference, for example, access point 106 can adjust a RoT threshold and/or noise floor to increase transmission power used by devices communicating therewith. In this example, access point 106 can obtain transmission power 118 of serving access point 104 and/or other neighboring access points (not shown) at least in part by using an NLM or other device, receiving an indication of power from the serving access point 104, and/or the like. Access point 106 can adjust an noise floor by a difference in transmission power between access point 106 and serving access point 104. In another example, access point 106 can adaptively adjust the noise floor or a RoT threshold based at least in part on the difference.

In yet another example, device 102 can communicate simultaneously with serving access point 104 and access point 106 (e.g., in soft handover (SHO)) such that device 102 communicates control data with serving access point 104 and receives user plane data from access point 106 and/or serving access point 104. In this example, where access point 106 utilizes a higher transmit power than serving access point 104, serving access point 104 may not be able to reliably receive control data from device 102 since access point 106 can control power of device 102 as well, as part of SHO. In this example, access point 106 can enforce the adjusted noise floor in communicating with device 102 (e.g., and not other devices that are not using SHO with access point 106 as the serving access point), which can cause device 102 to increase transmission power so serving access point 104 can obtain control data therefrom. The above modifications allow for managing interference caused by access points deployed in a wireless network.

Figure 2:
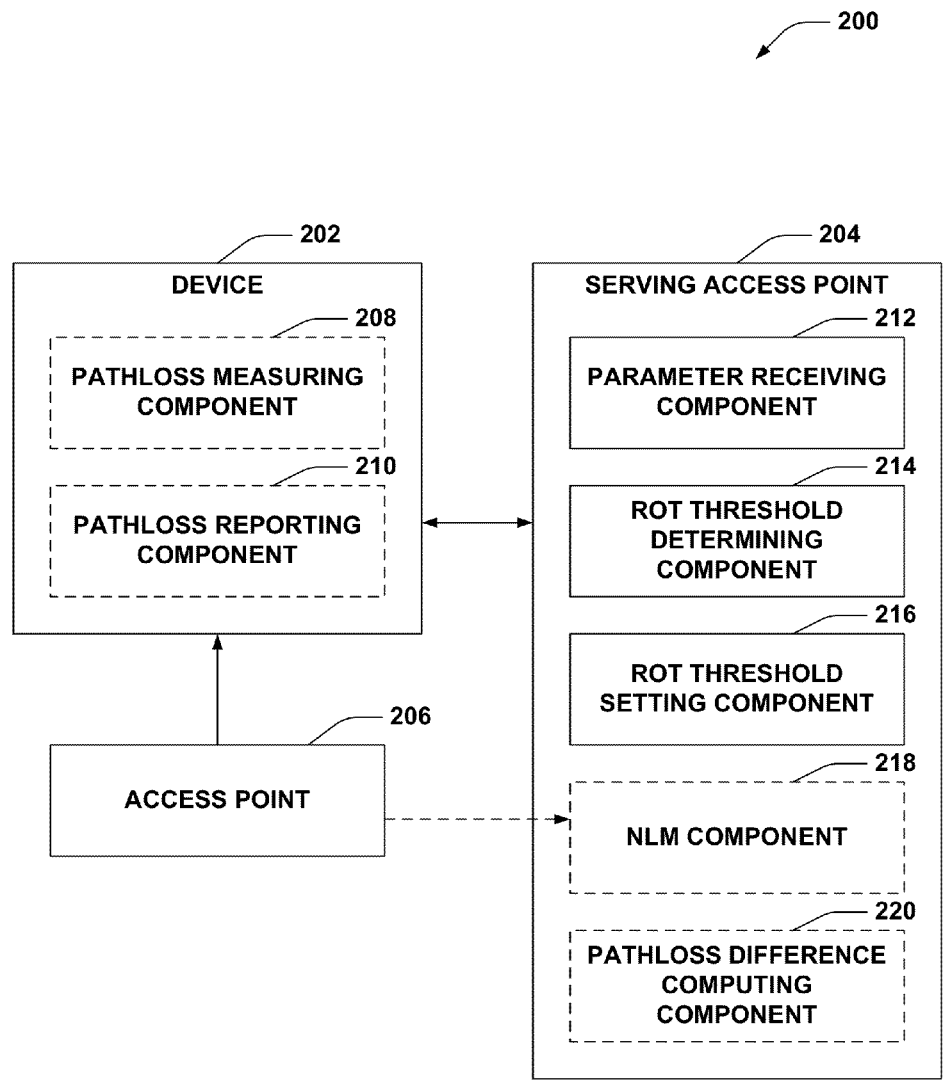
FIG. 2 is a block diagram of an example system for determining a rise-over-thermal (RoT) threshold for mitigating device interference to other access points.

Turning to FIG. 2, an example wireless communication system 200 is illustrated for setting a RoT threshold at an access point. System 200 comprises a device 202 that communicates with a serving access point 204 to receive access to one or more wireless network components, as described. In addition, system 200 can include another access point 206 with which device 202 can potentially interfere due at least in part to communicating with serving access point 204. For example, deployment of serving access point 204 can result in interference to other access points in the vicinity of serving access point 204 (not shown), whether caused by serving access point 204, device 202 or other devices communicating with serving access point 204, etc. As described, for example, device 202 can be a UE, modem, etc., and serving access point 204 can be a femtocell access point, H(e)NB, and/or the like. Access point 206, for example, can be a macrocell access point, femtocell or picocell access point, mobile base station, relay, etc., as described.

Device 202 can optionally comprise a pathloss measuring component 208 that determines a pathloss to one or more access points, and a pathloss reporting component 210 that communicates the determined pathloss to one or more access points or devices. Serving access point 204 comprises a parameter receiving component 212 for obtaining one or more parameters related to a communication environment (e.g., communicating in a macrocell), a RoT threshold determining component 214 for determining an RoT threshold for serving access point based at least in part on the one or more parameters, and a RoT threshold setting component 216 for utilizing the RoT threshold at serving access point 204. Serving access point 204 can also optionally comprise a NLM component 218 for obtaining and processing one or more signals from one or more access points, and/or a pathloss difference computing component 220 for determining a pathloss difference between serving access point 204 and one or more other access points.

According to an example, parameter receiving component 212 can obtain one or more parameters related to one or more other access points within a range of serving access point 204, such as access point 206, or one or more other femtocell, macrocell, or substantially any type of access point. For example, this can correspond to one or more parameters regarding a communications environment near access point 206, a location of access point 206 relative to serving access point 204, etc. Based at least in part on the one or more parameters, for example, RoT threshold determining component 214 can determine a RoT threshold for serving access point 204 to mitigate interference to other access points (e.g., caused by devices communicating with serving access point 204). Moreover, being within range of serving access point 204 or parameters measured within a range of serving access point 204 can refer to signals from access point 206 being heard by serving access point 204, devices communicating with serving access point 204, such as device 202, etc.

For example, where a RoT threshold for serving access point 204 is at a high level, device 202 attempting to access the serving access point 204 (e.g., attempting to access the random access channel (RACH) thereof) can increase transmission power to reach a signal-to-noise ratio (SNR) corresponding to the RoT threshold. This can, however, cause interference to access point 206 when device 202 communicates with serving access point 204 using the transmission power. Using a high RoT threshold, however, improves throughput for device 202 at serving access point 204, and can improve resistance to interference from other devices communicating with other access points. Thus, using one or more parameters regarding the communications environment of serving access point 204, RoT threshold determining component 214 can determine an RoT threshold for serving access point 204.

For example, where the one or more parameters comprise a location of access points relative to serving access point 204

(e.g., and/or an absolute location of serving access point 204 compared to that of access point 206), RoT threshold determining component 214 can evaluate a distance between serving access point 204 and known locations of one or more other access points. For example, parameter receiving component 212 can receive locations of the one or more access points from an access point management server, such as a home eNB management server, a positioning server, such as a serving mobile location center (SMLC), etc. (not shown), access point 206, device 202 or other devices, and/or the like. In this example, RoT threshold determining component 214 can compute a distance to the one or more access points based on location of the serving access point 204 (which can also be received from a positioning server, for example) and received location of the one or more access points, such as access point 206, and can determine a RoT threshold for serving access point 204 based on the computed distance to mitigate interference to the other access points. In one example, NLM component 218 can obtain signals from access point 206, and can determine a signal strength; parameter receiving component 212 can obtain the signal strength from NLM component 218, and RoT threshold determining component 214 can determine the RoT threshold for serving access point 204 additionally or alternatively based on the signal strength to mitigate interference to access point 206.

In another example, device 202 can report pathloss measurements to serving access point 204 to facilitate determining a RoT threshold. In this example, pathloss measuring component 208 can measure pathloss to serving access point 204, one or more neighboring access points, such as access point 206, and/or the like, and pathloss reporting component 210 can communicate the pathloss measurements to serving access point 204. Parameter receiving component 212 can obtain the pathloss measurements, and RoT threshold determining component 214 can determine a RoT threshold for serving access point 204 based at least in part on the pathloss measurements. For example, SNR at serving access point 204 for device 202 communicating therewith (e.g., trying to access a RACH) can be:

$$\gamma_{RACH} = TxPwr_F - PL_F - (RoT + No_F)$$

where $TxPwr_F$ is a transmission power for device 202 to successfully access serving access point 204, $PL_F$ is a pathloss to serving access point 204 measured by device 202, RoT is an RoT at the serving access point 204, and $No_F$ is the noise floor at the serving access point 204. In one example, the noise floor can be predetermined and/or received in a configuration (e.g., from an access point management server, and/or the like).

In addition, interference caused to an access point, such as access point 206, can be negligible, so as not to impact the access point 206 and/or devices communicating therewith:

$$TxPwr_F - PL_M < No_M - \Delta_M$$

where $PL_M$ is a pathloss to access point 206 measured by device 202, $No_M$ is a noise floor of access point 206, and $\Delta_M$ is a maximum interference level with respect to the noise floor of access point. Combining these formulas yields:

$$RoT < (PL_M - PL_F) + (No_M - No_F) - \gamma_{RACH} - \Delta_M$$

and RoT threshold determining component 214 can compute an upper bound RoT threshold as:

$$RoT_{bound\_1} = Func1(PL_M - PL_F) + (No_M - No_F) - \gamma_{RACH} - \Delta_M$$

where pathloss measuring component 208 measures, and pathloss reporting component 210 reports, $PL_M$ and $PL_F$ to serving access point 204, RoT threshold determining component 214 obtains $No_M$ and $No_F$ from an access point management server and/or access point 206, and RoT threshold determining component 214 computes $\gamma_{RACH}$ as shown above and obtains $\Delta_M$ as a fixed value (e.g., from an access point management server or other core network component, a configuration, and/or the like). In addition, Func1 can be substantially any function of $PL_M - PL_F$, such as a minimum function, a percentile distribution (e.g., 10th percentile), etc., which can be configured by RoT threshold determining component 214 (e.g., based on a hardcoded configuration, a configuration received from one or more network components, etc.).

In another example, where multiple access points are present in the vicinity of serving access point 204 and potentially interfered, the upper bound RoT threshold can be determined as:

$$RoT_{bound\_1} = \min_k(Func1(PL_{M,k} - PL_F)) + (No_M - No_F) - \gamma_{RACH} - \Delta_M$$

where k is an index of a respective access point (e.g., a macrocell, femtocell, picocell, etc. access point). In addition, however, device 202 can access serving access point 204 under a constraint of a maximum transmit power, which can be set by the serving access point 204:

$$\gamma_{FACH} < Max\_TxPwr_F - PL_F - (RoT + No_F)$$

where Max_TxPwr is the maximum transmit power, which can be received or otherwise determined by parameter receiving component 212. This can yield another upper bound RoT threshold that RoT threshold determining component 214 can compute:

$$RoT_{bound\_2} = Max\_TxPwr_F - Func2(PL_F) - \gamma_{RACH} - No_F$$

where $Func2(PL_F)$ is a function on statistics of $PL_F$ at a plurality of device locations (e.g., a minimum function, percentile distribution, etc.). Thus, RoT threshold determining component 214, in an example, can compute the RoT threshold for serving access point as:

$$RoT_{thres} = \min(RoT_{bound\_1}, RoT_{bound\_2})$$

For example, the various pathloss measurements discussed above can be performed by the device 202 and/or NLM component 218 periodically (e.g., based on one or more timers), upon request from serving access point 204 (e.g., as part of a training period indicated by serving access point 204), and/or the like. RoT threshold determining component 214, as described, can receive the pathloss measurements and accordingly determine a RoT threshold. In one example, the pathloss measurements for $PL_{M,k} - PL_F$, statistics of $PL_F$, etc., can be computed using a training period during which one or more devices report pathloss measurements. For example, upon initialization or otherwise (e.g., based on an event or other trigger), serving access point 204 can determine downlink transmit power based on parameters detected of other access points within the vicinity, such as access point 206 (e.g., received signal strength, broadcasted system information, and/or the like), and can accordingly determine a downlink coverage area based on the parameters. RoT threshold determining component 214 can also set an initial RoT threshold based on NLM component 218 measuring a pathloss to the one or more access points, as described.

Subsequently, in this example, serving access point 204 can enter the training period to request pathloss measurements from one or more devices, such as device 202, to one or more access points, such as access point 206. In one example, NLM component 218 can have collected identifiers of serving access points (e.g., primary scrambling codes (PSC)) upon initially measuring to determine downlink transmit power, as described above. Pathloss difference computing component 220 can request the pathloss measurements from the devices, such as device 202 and can accordingly specify the identifiers to the devices. The devices, such as device 202, can utilize pathloss measuring components, such as pathloss measuring component 208, to measure pathloss to one or more of the identified access points. In addition, where pathloss measuring component 208 encounters additional access points, pathloss reporting component 210 can report the pathloss to serving access point 204, and pathloss difference computing component 220 can add identifiers of the additional access points to the list of determined identifiers.

Once the pathloss measurements are gathered from the devices, such as device 202, to the one or more access points, such as access point 206, pathloss difference computing component 220 can generate a pathloss difference report or cumulative density function (CDF) for each access point for which a pathloss measurement is received. For example, for each pathloss measurement for serving access point 204, $PL_F$, reported by a device, pathloss difference computing component 220 can locate a kth pathloss sample to another access point, $PL_{M,k}$, by the device reported at the closest time and compute the difference $PL_{M,k}-PL_F$. Thus, pathloss difference computing component 220 can compute a set of $PL_{M,k}-PL_F$ for each reported $PL_F$, and can construct a corresponding pathloss difference CDF. In another example, pathloss difference computing component 220 can construct the CDF based on the $PL_F$ samples reported during the training period. As described, RoT threshold determining component 214 can utilize the pathloss difference CDF in determining a RoT threshold (e.g., by using the pathloss CDF in Func1 or Func2, shown above).

Figure 3:
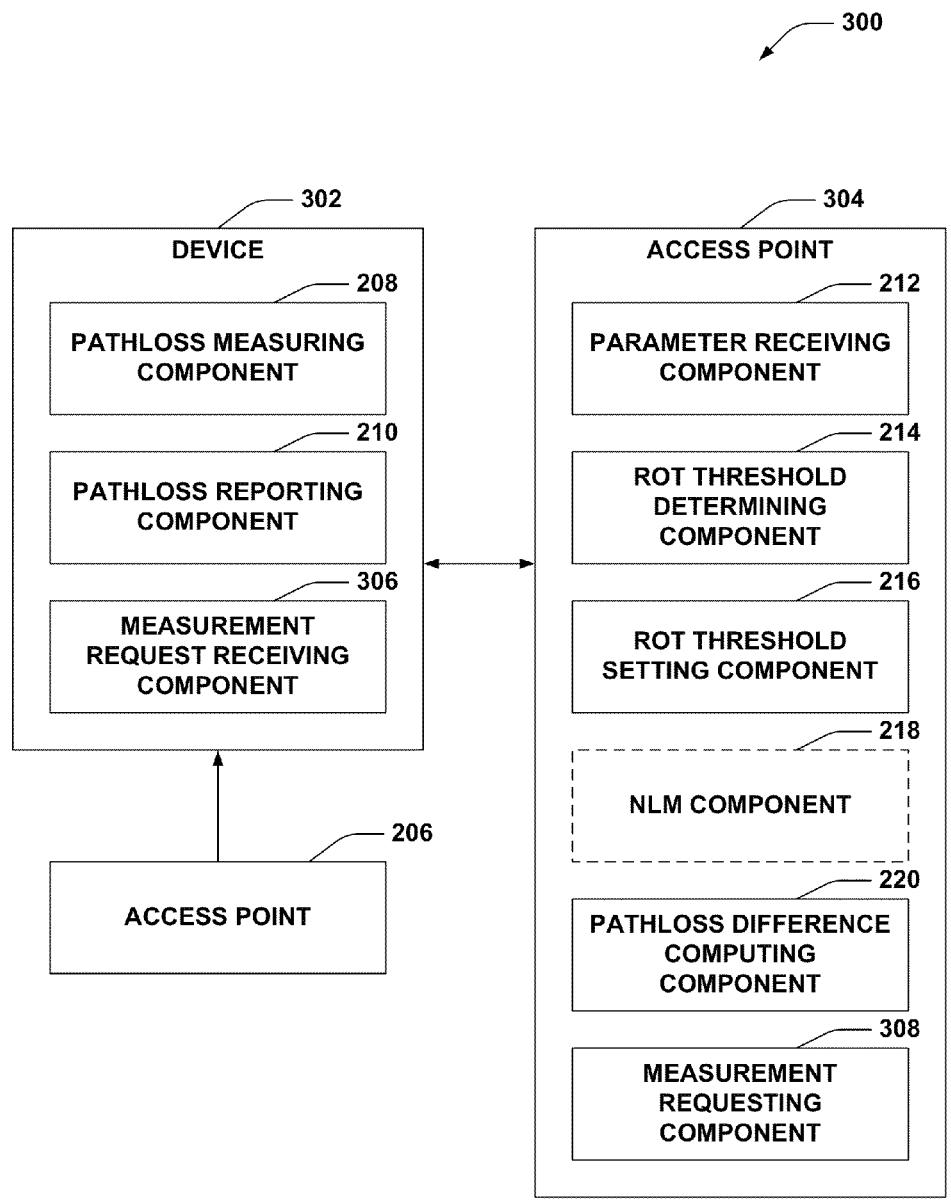
FIG. 3 is a block diagram of an example system for requesting pathloss measurements from one or more devices.

Referring to FIG. 3, an example wireless communication system 300 is illustrated for generating a pathloss difference CDF. System 300 comprises a device 302 that communicates with an access point 304 to receive access to a wireless network. System 300 also comprises an access point 206, with which device 302 can potentially interfere (which can include interfering with devices communicating with access point 206) while transmitting signals to access point 304. In this regard, for example, access point 304 and/or access point 206 can be deployed within a vicinity of one another. As described, device 302 can be a UE, modem, etc., access point 304 and/or access point 206 can each be a macrocell, femtocell, or picocell access point, etc.

Device 302 can comprise a pathloss measuring component 208 for determining a pathloss to one or more access points, a pathloss reporting component 210 for communicating the pathloss to one or more similar or different access points, and a measurement request receiving component 306 for obtaining a request from an access point to provide pathloss measurements corresponding to one or more access points.

Access point 304 comprises a parameter receiving component 212 for obtaining one or more pathloss measurements to one or more access points from a device, a RoT threshold determining component 214 for determining an RoT threshold for the access point 304 based at least in part on the one or more pathloss measurements, and an RoT threshold setting component 216 for utilizing the RoT threshold at access point 304. Access point 304 can additionally comprise an optional co-located NLM component 218 for receiving signals from one or more access points for determining a pathloss thereto, a pathloss difference computing component 220 for determining a pathloss difference between access point 304 and one or more other access points based on device measurements, and a measurement requesting component 308 for communicating a request to one or more devices to perform one or more pathloss measurements.

According to an example, access point 304 can collect pathloss statistics for computing a RoT threshold, as described. For example, pathloss measuring component 208 can measure pathloss to access point 304, one or more neighboring access points, such as access point 206, and/or the like, and pathloss reporting component 210 can communicate the pathloss measurements to access point 304. Parameter receiving component 212 can obtain the pathloss measurements, and RoT threshold determining component 214 can determine a RoT threshold for access point 304 based at least in part on the pathloss measurements, as described above. Moreover, for example, measurement requesting component 308 can request device 302 and/or other devices to perform one or more pathloss measurements to facilitate determining the RoT threshold.

In an example, measurement requesting component 308 can determine a set of access points to monitor from which a RoT threshold can be computed based on pathloss to the set of access points from various devices to mitigate interference thereto. For example, measurement requesting component 308 can utilize NLM component 218 to scan a primary scrambling code (PSC) range, or other access point identifying range, to determine access points and/or related cells from which signals can be received by NLM component 218, such as access point 206.

In another example, measurement requesting component 308 can determine another operating frequency for one or more of the determined access points, and can request that the one or more devices perform an inter-frequency measurement for the one or more of the determined access points over the other operating frequency (e.g., in addition or alternatively to the original operating frequency specified for the one or more of the determined access points). This can facilitate measuring the one or more of the determined access points where one or more devices cannot detect signals therefrom (e.g., the pilot transmit power is received below a threshold detection signal-to-interference ratio (SIR)) over the original operating frequency. In one example, the measurement requesting component 308 can determine to request measuring on the other operating frequency upon not receiving measurements for the one or more of the determined access points within a given period of time. Moreover, in an example, the other operating frequency can be adjacent to the original operating frequency of the one or more of the determined access points.

Once measurement requesting component 308 determines the set of access points and/or operating frequencies thereof, measurement requesting component 308 can configure one or more devices, such as device 302, to measure and report pathloss to at least a portion of access points in the set (e.g., including access point 206) as well as to the access point 304, as part of a training period. Measurement request receiving component 306 can obtain the request to measure the pathloss, and pathloss measuring component 208 can accordingly receive signals from at least the portion of the set of access points and the access point 304 and measure pathloss based on the signals.

In this example, pathloss reporting component 210 can communicate the measured pathloss to one or more access points, including access point 304 and access point 206, to access point 304. It is to be appreciated that pathloss measuring component 208 can measure, and pathloss reporting component 210 can report, pathloss to additional access points having other PSCs, and measurement requesting component 308 can add the additional PSCs to the set of access points.

Parameter receiving component 212 can receive the pathloss measurements from device 302 and/or additional pathloss measurements from other devices, as described. In this regard, the pathloss measurements can be received for at least a portion of access points in the set of access points based on different device locations. Parameter receiving component 212 can construct a pathloss cumulative density function (CDF), or other combination of the pathloss measurements, for each access point in the set based at least in part on the pathloss measurements as received. Alternatively, the parameter receiving component 212 can characterize pathloss to each access point in the set of access points based at least in part on measuring signals from the access points using NLM component 218.

Once the parameter receiving component 212 obtains a number of pathloss measurements and determines the CDF for the portion of access points, parameter receiving component 212 can also compute a difference CDF for each access point in the portion of access points for which pathloss measurements are received. For example, for each pathloss measurement reported for access point 304 from a device, $PL_F$, such as device 302, parameter receiving component 212 can determine pathloss to the ith access point, $PL_M(i)$, reported at the closest time from the specific device. For example, parameter receiving component 212 can evaluate i pathloss measurements reported by the device to determine the one with the closest time, where i is the number of access points in the set measured by the device. Parameter receiving component 212 can compute the difference in the pathloss measurements, $PL_M(i)-PL_F$, for each reported $PL_F$, and can accordingly construct the difference CDF.

Alternatively, where parameter receiving component 212 characterizes the pathloss difference using the NLM component 218, the parameter receiving component 212 can compute the pathloss difference using the measured pathloss of an access point in the set of access points acquired from NLM component 218 along with an assumed pathloss of access point 304 (e.g., 90 decibel (db) coverage radius based on downlink transmission power). In either example, RoT threshold determining component 214 can determine an RoT threshold for access point 304 based at least in part on the difference CDF or other computed pathloss differences to access points in the set of access points. For example, RoT threshold determining component 214 can determine the RoT threshold based at least in part on a pathloss to an access point in the set of access point having the lowest pathloss measurement, $PL_M(i)$, or pathloss difference measurement, $PL_M(i)-PL_F$.

For example, RoT threshold determining component 214 can determine a pathloss threshold for the set of access points based at least in part on the previously determined CDF or difference CDF. For example, the pathloss threshold can be determined based at least in part on one or more reported pathloss differences in the CDF. In one example, RoT threshold determining component 214 can determine the pathloss threshold to be a certain percentile distribution of the pathloss differences in the CDF (e.g., the lowest reported difference, a n-percentile of lowest reported differences, etc.). In any case, RoT threshold setting component 216 can utilize the RoT threshold for the access point 304, as described.

Figure 4:
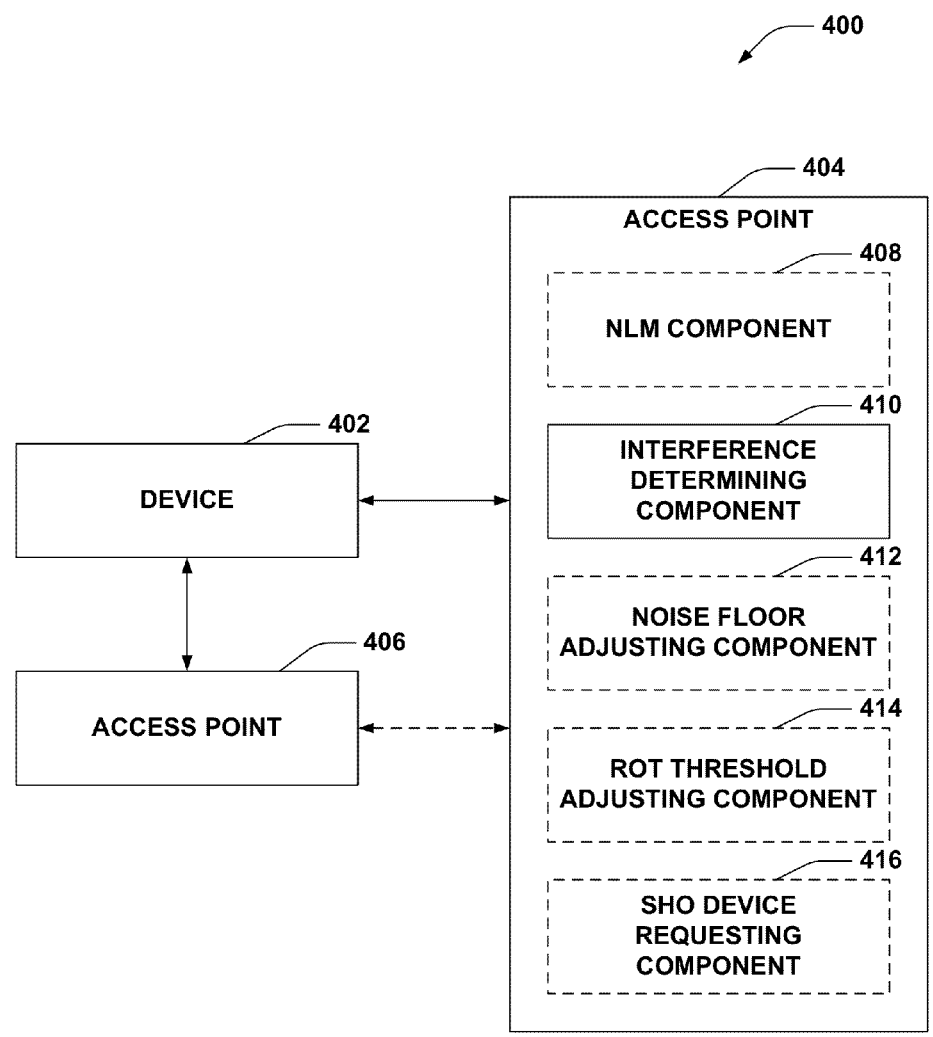
FIG. 4 is a block diagram of an example system for adjusting a noise floor or other parameters of an access point.

Referring to FIG. 4, an example wireless communication system 400 is illustrated for adjusting noise floor or RoT threshold of an access point. System 400 comprises a device 402 that communicates with one or more access points 404 and/or 406 to receive access to a wireless network. As described, for example, device 402 can potentially interfere with access point 406 while transmitting signals to access point 404 (which can include interfering with devices communicating with access point 406) and/or vice versa. In this regard, for example, access points 404 and/or 406 can be deployed within a vicinity of one another. As described, device 402 can be a UE, modem, etc., access points 404 and/or 406 can each be a macrocell, femtocell, or picocell access point, etc.

Access point 404 can comprise an optional NLM component 408 for receiving signals from one or more access points, and an interference determining component 410 for determining a level of interference potentially caused by one or more access points (e.g., based at least in part on a transmission power thereof). Access point 404 can also optionally comprise a noise floor adjusting component 412 for modifying a noise floor of access point 404 based at least in part on the determined potential interference, a RoT threshold adjusting component 414 for modifying a RoT threshold of access point 404 based at least in part on the determined potential interference, and/or a SHO device requesting component 416 for requesting a list of identifiers of one or more devices for which one or more access points provide SHO access.

According to an example, access point 404 can transmit at a different power than access point 406. For example, where access point 406 serves device 402 and transmits at a higher power, device 402 can be physically closer to access point 404, but can still communicate with access point 406 due to the higher transmission power. This can cause interference to access point 404. In an example, as part of access point 404 initialization or based on one or more events or other triggers (e.g., a timer, detecting presence of an new access point, etc.), interference determining component 410 can discern potential interference that can be caused by one or more neighboring access points, such as access point 406, and can adjust one or more parameters of access point 404 to mitigate the potential interference.

In one example, access point 404 can obtain pilot transmission power of access point 406 and/or one or more other neighboring access points. For example, NLM component 408 can detect signals from the one or more neighboring access points, such as access point 406, and can determine the downlink pilot transmission power thereof based at least in part on measuring the signal, processing data represented in the signal, and/or the like. In another example, interference determining component 410 can receive the downlink pilot transmission power of the one or more neighboring access points from an access point management server or other core network component, etc. In any case, interference determining component 410 can accordingly determine the existence and/or amount of potential interference from the one or more access points. In one example, interference determining component 410 can determine such based on comparing the downlink transmission powers with a downlink transmission power of access point 404.

For example, based on the determined possible interference, noise floor adjusting component 412 can adjust the noise floor of access point 404. In one example, interference determining component 410 can determine a strongest downlink pilot transmission power received or observed by NLM component 408 (e.g., in the case of single or multiple neighboring access points). Noise floor adjusting component 412 can adjust the noise floor according to the following formula, for example:

$$XdB=\max(0, Own\_Pilot\_TxPwr - Strongest\_Pilot\_TxPwr)$$

where Own_Pilot_TxPwr is the transmission power of access point 404, and Strongest_Pilot_TxPwr is the transmission power of the strongest neighboring access point (e.g., access point 406). For example, by raising the noise floor of access point 404, devices communicating therewith can increase transmission power to mitigate impact of interference on access point 404. In this regard, for example, access point 404 can enforce the modified noise floor in communicating with one or more devices (e.g., in a power control command to the one or more devices based on a received power). For example, the noise floor adjusting component 412 can modify an uplink power control algorithm by adding a virtual noise power to the estimated noise plus interference power for pilot SNR computation. In addition, for example, the one or more devices can inject additional noise, modify a RF frontend attenuator, etc. based on the noise floor adjustment.

In another example, noise floor adjusting component 412 can adaptively adjust the noise floor for access point 404 based on an estimated level of out-of-cell interference (e.g., based on interference received from device 402 when communicating with access point 406). For example, interference determining component 410 can measure or estimate a level of interference to access point 404, which can include measuring a noise level during a silence interval or other period of time (e.g., using NLM component 408), measuring a transmitted signal received by NLM component 408 and determining a level of noise on top of the signal based on the power used to transmit the signal from access point 404, and/or the like. In any case, for example, noise floor adjusting component 412 can adaptively adjust the noise floor according to a formula similar to the following:

$$YdB = \max(0, \min(XdB, Out\_of\_Cell\_Intf\_dB + Margin\_dB))$$

where Out_of_Cell_Intf_dB is the measured or estimated out-of-cell interference level, and Margin_dB is a constant value that renders the out-of-level interference insignificant based on the increased noise floor. Thus, there is no increase in noise floor for zero estimated out-of-cell interference to prevent unnecessarily increasing device transmit power in view of increasing noise floor.

In yet another example, instead of or in addition to adjusting the noise floor, RoT threshold adjusting component 414 can modify an RoT threshold of access point 404 according to potential or actual interference or one or more access points as determined by interference determining component 410. In one example RoT threshold adjusting component 414 can modify the RoT threshold of access point 404 based at least in part on the computed XdB, shown above. For example, RoT threshold adjusting component 414 can compute the RoT threshold adjustment based on the following formula, or a similar formula:

$$YdB = \begin{cases} 0, & \text{if } 0 < XdB \leq 5 \\ 3, & \text{if } 5 < XdB \leq 10 \\ 6, & \text{if } 10 < XdB \leq 15 \\ 9, & \text{otherwise} \end{cases}$$

such that the RoT threshold corresponds to XdB according to a function, which can be linear in this example, though other classes of functions can similarly be utilized in this regard. Similarly, RoT threshold adjusting component 414 can adjust the RoT threshold where interference determining component 410 detects out-of-cell interference, as described in one example. Furthermore, RoT threshold adjusting component 414 can comply with a computed upper bound RoT threshold, as described in FIG. 2 to limit interference to other access points in the vicinity as well.

In yet another example, device 402 can be served by access point 406 and also can communicate user plane data with access point 404 (e.g., and access point 406) in SHO. In this example, access points 404 and 406 can both control uplink transmission power of the device 402 (e.g., by communicating power adjustment commands thereto). In some examples, where device 402 is nearer to access point 406 but has less pathloss to access point 404, for example, access point 404 can adjust device 402 transmission power down, while access point 406 attempts to increase transmission power of device 402. In this example, noise floor adjusting component 412 can adjust an estimated noise floor for modifying power algorithms for devices not served by access point 404 in SHO. Thus, for example, SHO device requesting component 416 can request a list of identifiers from one or more access points, such as access point 406, corresponding to devices served by the one or more access points in SHO.

In this example, noise floor adjusting component 412 can compute a noise floor adjustment based at least in part on an actual or possible interference determined by interference determining component 410. Noise floor adjusting component 412 can then identify devices to which access point 404 communicates in SHO that are served by access point 406 or the one or more other access points based on received device identifiers, and can modify an uplink power allocation to the devices, such as device 402, based at least in part on the computed noise floor. Thus, communicating an increase in noise floor for access point 404 to device 402 can cause device 402 to increase transmit power, which can improve control channel quality between device 402 and access point 406. In this example, noise floor adjusting component 412 can refrain from communicating the noise floor adjustment to devices served by access point 404 to mitigate interference potentially caused by the devices to access point 406 or other access points.

Referring to FIGS. 5-9, example methodologies relating to adjusting one or more parameters of a femtocell access point to mitigate interference are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 5:
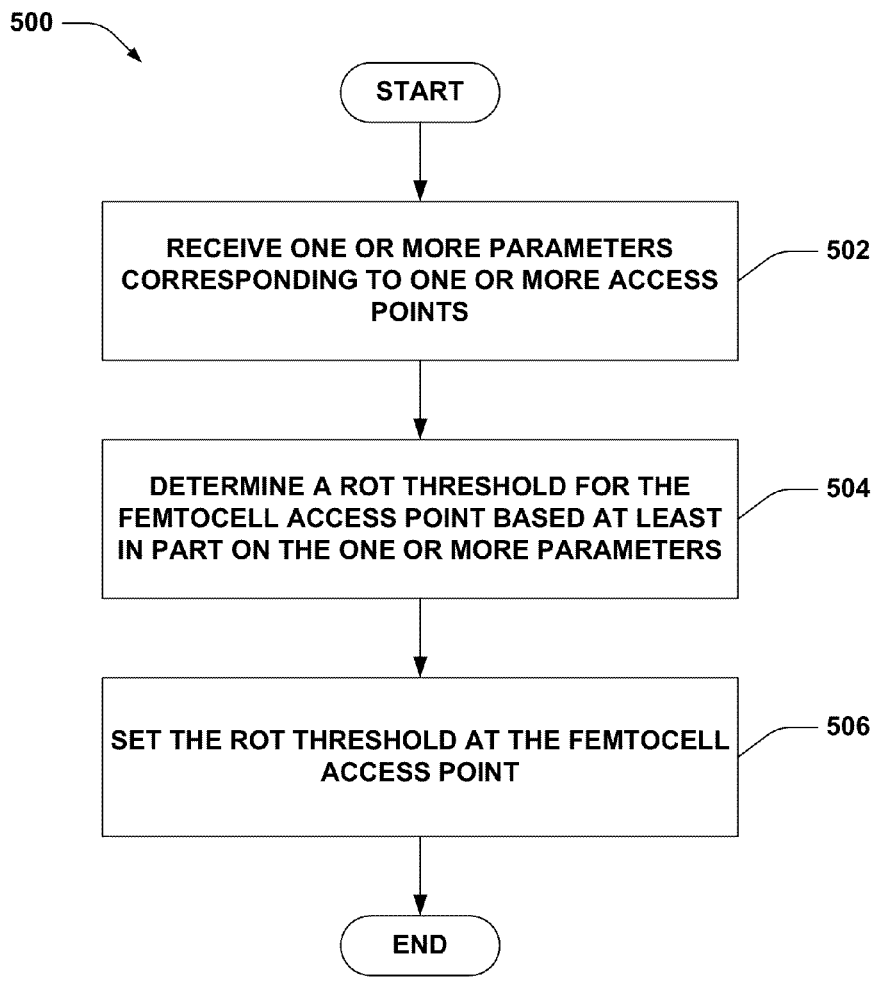
FIG. 5 is a flow chart of an aspect of an example methodology for determining a RoT threshold for an access point.

Referring to FIG. 5, an example methodology 500 is displayed that facilitates determining a RoT threshold. At 502, one or more parameters corresponding to one or more access points. For example, the one or more parameters can correspond to radio conditions of the one or more access points (e.g., pathloss measurements thereto), a location of the one or more access points relative to the femtocell access point, and/or the like. Moreover, in an example, the one or more parameters can thus be received from a NLM, one or more devices (e.g., based on a request for measurements as part of a training period), and/or the like. Moreover, for example, the one or more parameters can relate to a maximum transmit power, pathloss statistics, etc., as described above, and the RoT threshold can be determined therefrom. At 504, a RoT threshold can be determined for the femtocell access point based at least in part on the one or more parameters. At 506, the RoT threshold can be set at the femtocell access point. For example, this can cause one or more devices to adjust a transmission power used to communicate with the femtocell access point.

Figure 6:
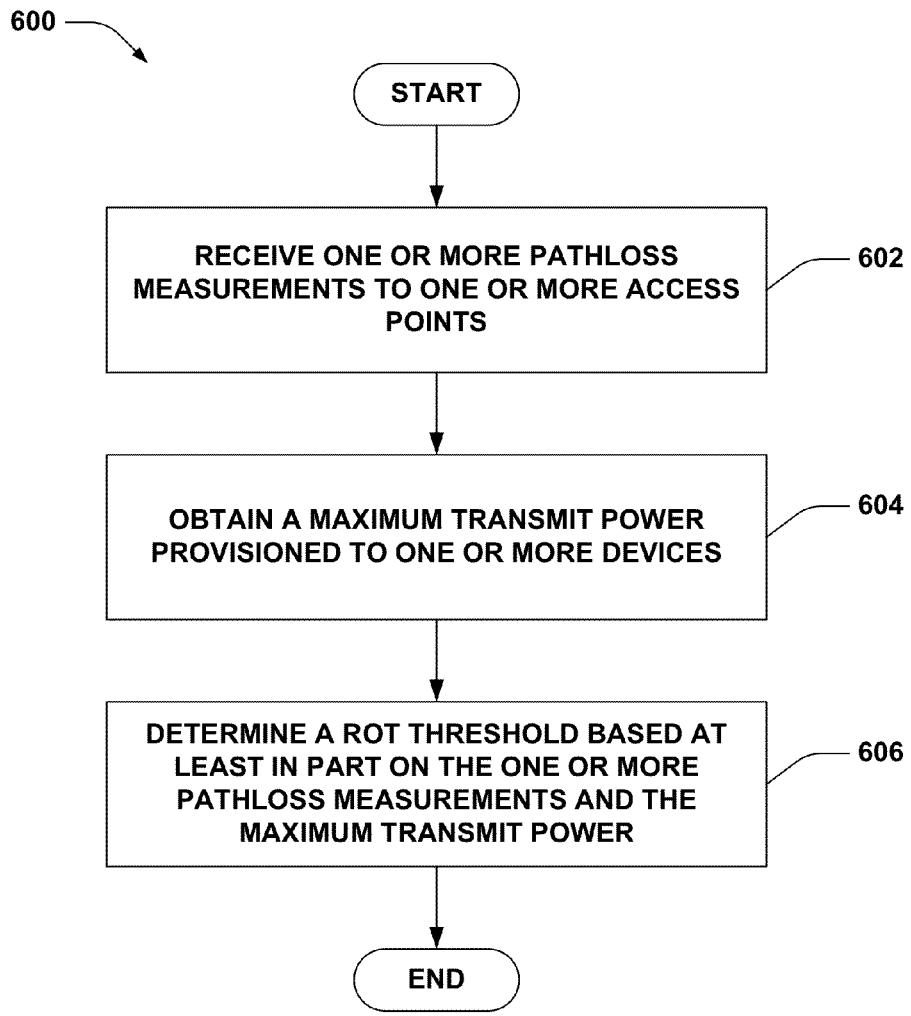
FIG. 6 is a flow chart of an aspect of an example methodology that determines a RoT threshold based on a transmit power.

Turning to FIG. 6, an example methodology 600 is displayed that determines a RoT threshold for a femtocell access point. At 602, one or more pathloss measurements to one or more access points can be received. As described, this can be based on a request for the measurements (e.g., as part of a training period or otherwise). Moreover, the pathloss measurements can be received from a device, a NLM co-located in the access point, etc. At 604, a maximum transmit power provisioned to one or more devices can be obtained. For example, this can be determined from one or more components that provision the maximum transmit power. At 606, a RoT threshold can be determined based at least in part on the one or more pathloss measurements and the maximum transmit power. As described, RoT thresholds can be computed for each of the pathloss measurements and maximum transmit power, and a minimum of the two can be set as the RoT threshold.

Figure 7:
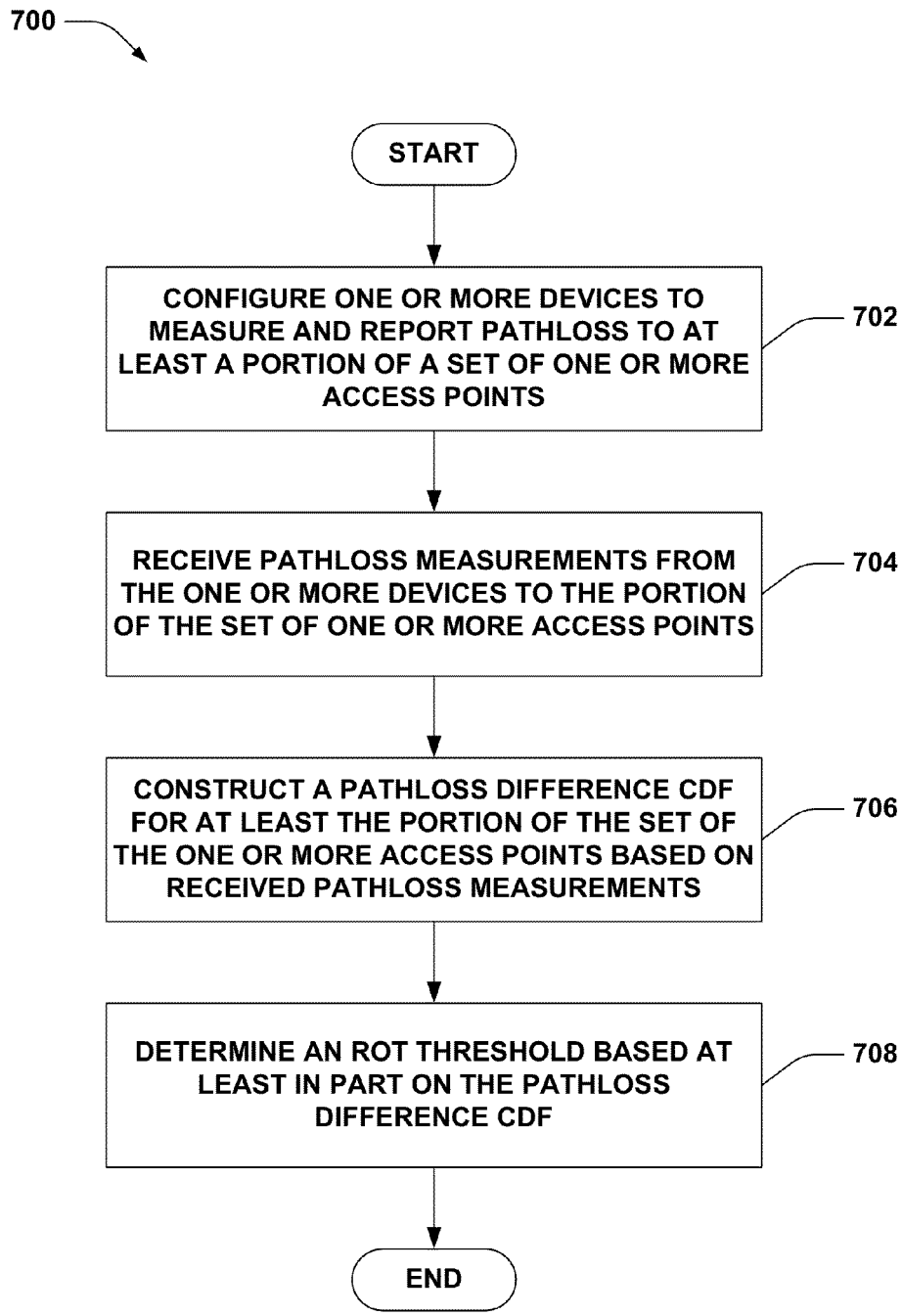
FIG. 7 is a flow chart of an aspect of an example methodology that determines a RoT threshold using a pathloss difference CDF.

Referring to FIG. 7, an example methodology 700 for determining a RoT threshold is illustrated. At 702, one or more devices can be configured to measure and report pathloss to at least a portion of a set of one or more access points. For example, as described, a set of access points can be determined (e.g., from receiving a list of one or more access points from a network component, device, etc., from detecting the one or more access points via a NLM, and/or the like). In this example, a request can be sent to the one or more devices to measure pathloss of the set of access points where the devices are able to receive signals therefrom. At 704, pathloss measurements can be received from the one or more devices to the portion of the set of one or more access points. For example, as described, this can include receiving power measurements or other measurements from which pathloss or similar parameters can be determined (e.g., a RSCP, CPICH transmit power, etc.). At 706, a pathloss difference CDF can be constructed for at least the portion of the set of the one or more access points based on received pathloss measurements. As described, this can include determining pathloss measurements received for one or more access points in the set of access points and subtracting another pathloss therefrom. At 708, an RoT threshold can be determined based at least in part on the pathloss difference CDF, as described above.

Figure 8:
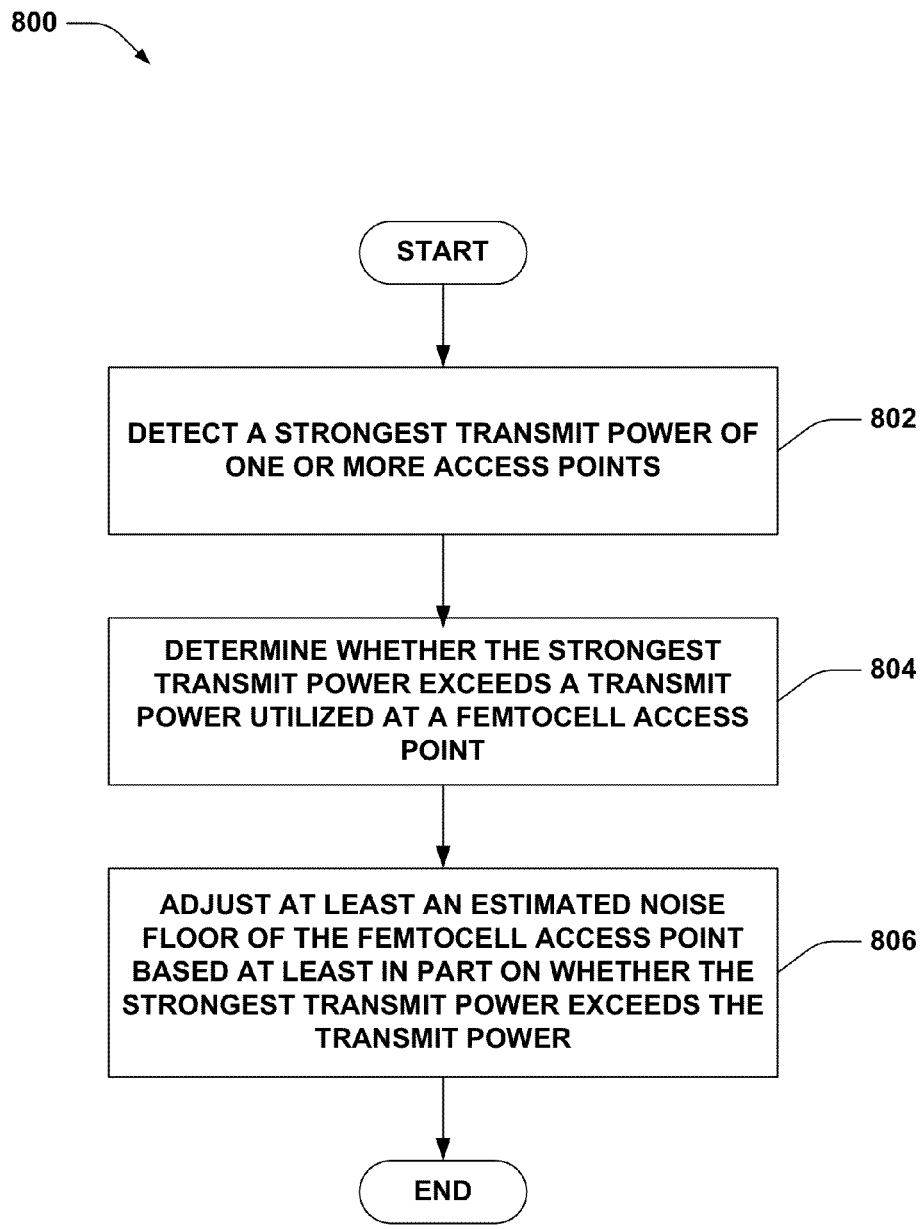
FIG. 8 is a flow chart of an aspect of an example methodology for adjusting a noise floor at an access point.

Turning to FIG. 8, an example methodology 800 is depicted for adjusting one or more parameters of an access point to mitigate interference. At 802, a strongest transmit power of one or more access points can be detected. For example, this can include receiving signals from one or more access points in a vicinity (e.g., using an NLM and/or from one or more devices) and determining which access point has the strongest signal power. At 804, it can be determined whether the strongest transmit power exceeds a transmit power utilized at a femtocell access point. At 806, at least an estimated noise floor of the femtocell access point can be adjusted based at least in part on whether the strongest transmit power exceeds the transmit power. In one example, the estimated noise floor can be adjusted by the amount the strongest transmit power exceeds the transmit power. In another example, the estimated noise floor can additionally be adjusted based on out-of-cell interference. Moreover, for example, a RoT threshold can be adjusted as well based on whether the strongest transmit power exceeds the transmit power.

Figure 9:
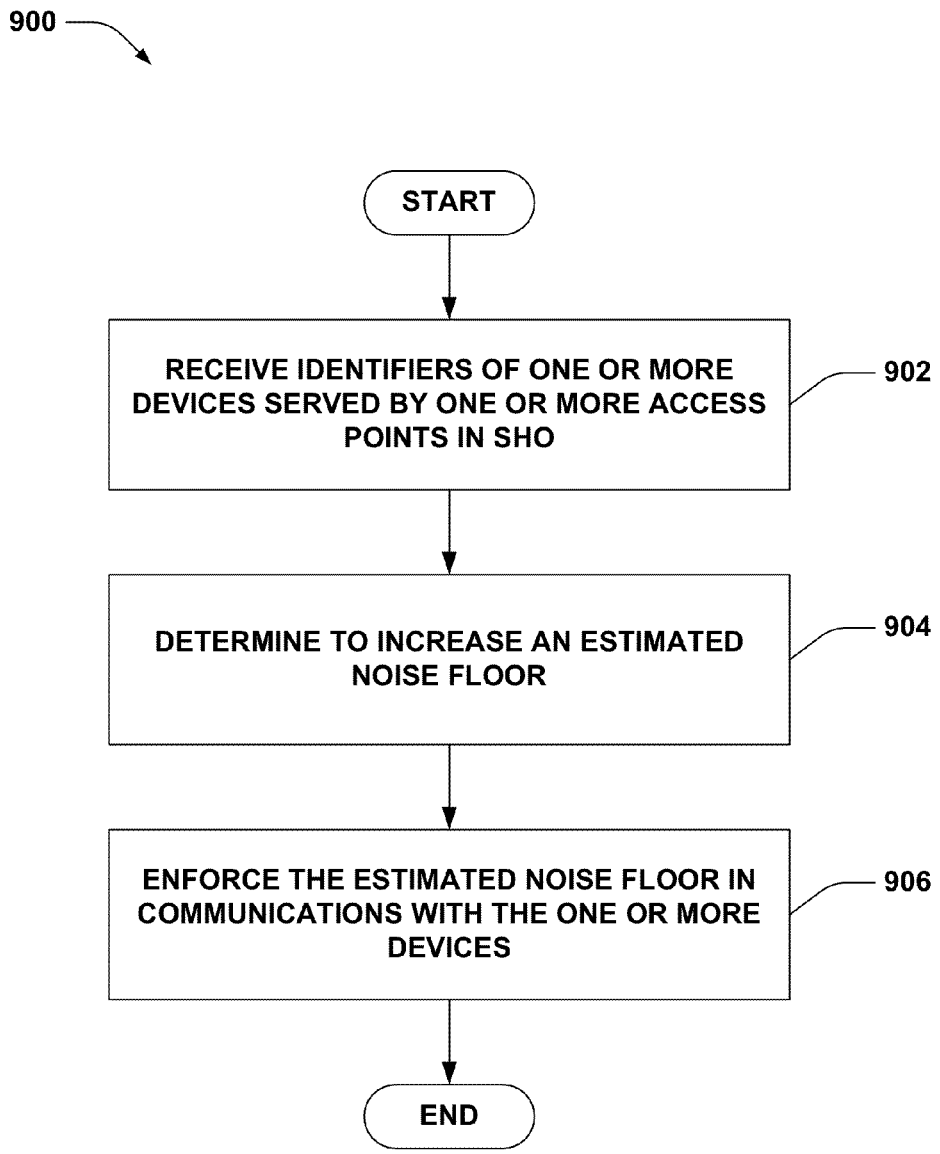
FIG. 9 is a flow chart of an aspect of an example methodology that enforces estimated noise floor for devices in soft handover.

Referring to FIG. 9, an example methodology 900 that facilitates enforcing noise floor increases on one or more devices is illustrated. At 902, identifiers of one or more devices served by one or more access points in SHO can be received. For example, this can be based at least in part on a request for such parameters. At 904, it can be determined to increase an estimated noise floor. For example, this can be based at least in part on detecting a transmission power at an access point that is stronger than a utilized transmission power. Moreover, the estimated noise floor can be specific to the one or more devices. At 906, the estimated noise floor increase can be enforced in communications with the one or more devices. In this regard, noise floor is not increased and enforced on served devices, but to devices served by other access points that are communicated with using SHO, as described.

It will be appreciated that, in accordance with one or more aspects described herein, inferences can be made regarding computing a RoT threshold, a noise floor adjustment, etc., and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 10:
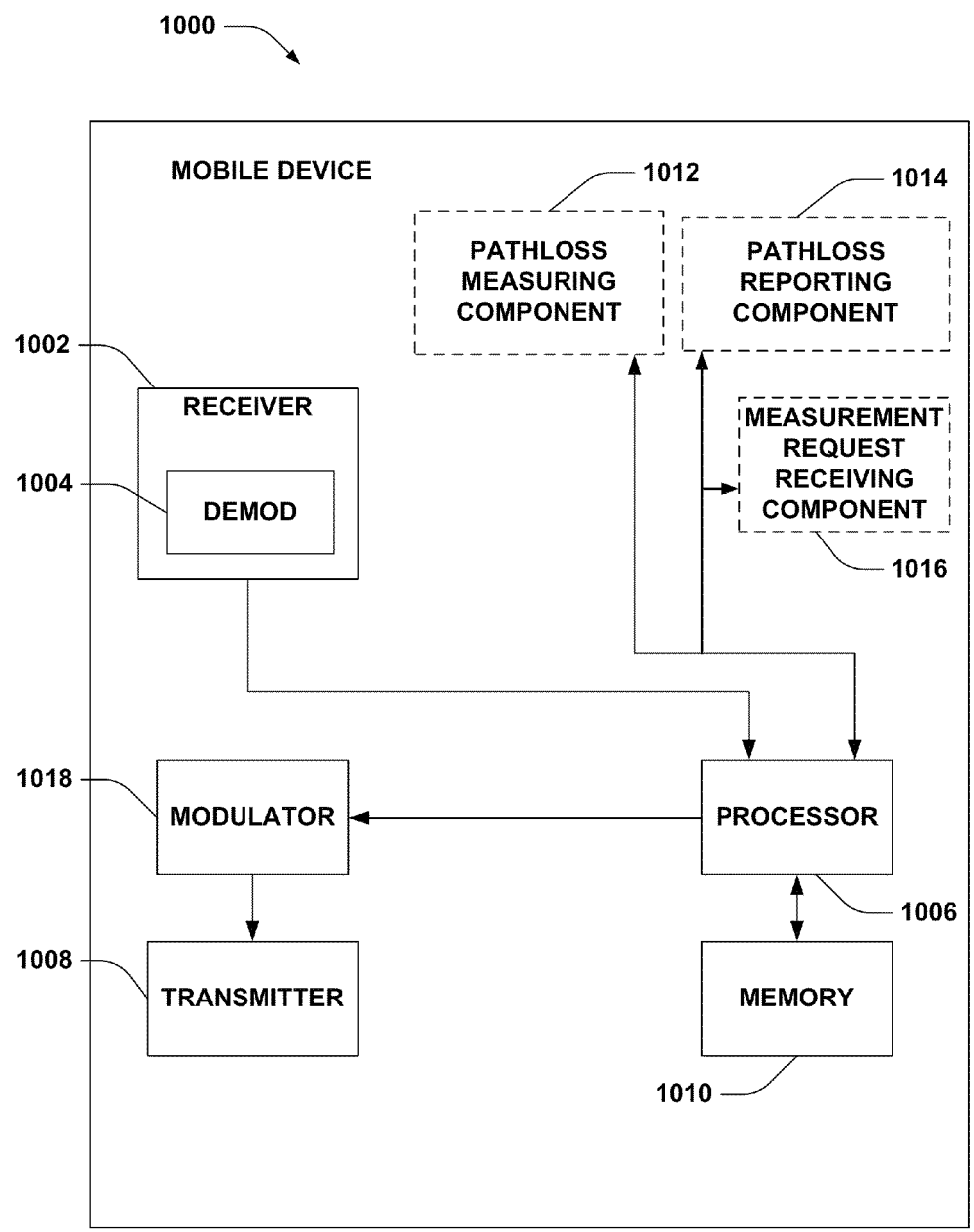
FIG. 10 is a block diagram of an example mobile device according to various aspects described herein.

FIG. 10 is an illustration of a mobile device 1000 that facilitates reporting pathloss measurements. Mobile device 1000 comprises a receiver 1002 that receives a signal from, for instance, a receive antenna (not shown), performs typical actions on (e.g., filters, amplifies, downconverts, etc.) the received signal, and digitizes the conditioned signal to obtain samples. Receiver 1002 can comprise a demodulator 1004 that can demodulate received symbols and provide them to a processor 1006 for channel estimation. Processor 1006 can be a processor dedicated to analyzing information received by receiver 1002 and/or generating information for transmission by a transmitter 1008, a processor that controls one or more components of mobile device 1000, and/or a processor that both analyzes information received by receiver 1002, generates information for transmission by transmitter 1008, and controls one or more components of mobile device 1000.

Mobile device 1000 can additionally comprise memory 1010 that is operatively coupled to processor 1006 and that can store data to be transmitted, received data, information related to available channels, data associated with analyzed signal and/or interference strength, information related to an assigned channel, power, rate, or the like, and any other suitable information for estimating a channel and communicating via the channel. Memory 1010 can additionally store protocols and/or algorithms associated with estimating and/or utilizing a channel (e.g., performance based, capacity based, etc.), reporting pathloss, etc.

It will be appreciated that the data store (e.g., memory 1010) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). The memory 1010 of the subject systems and methods is intended to comprise, without being limited to, these and any other suitable types of memory.

Processor 1006 can further be optionally operatively coupled to a pathloss measuring component 1012, which can be similar to pathloss measuring component 208, a pathloss reporting component 1014, which can be similar to pathloss reporting component 210, and a measurement request receiving component 1016, which can be similar to measurement requesting component 306. Mobile device 1000 still further comprises a modulator 1018 that modulates signals for transmission by transmitter 1008 to, for instance, a base station, another mobile device, etc. Moreover, for example, mobile device 1000 can comprise multiple transmitters 1008 for multiple network interfaces, as described. Although depicted as being separate from the processor 1006, it is to be appreciated that the pathloss measuring component 1012, pathloss reporting component 1014, measurement request receiving component 1016, demodulator 1004, and/or modulator 1018 can be part of the processor 1006 or multiple processors (not shown).

Figure 11:
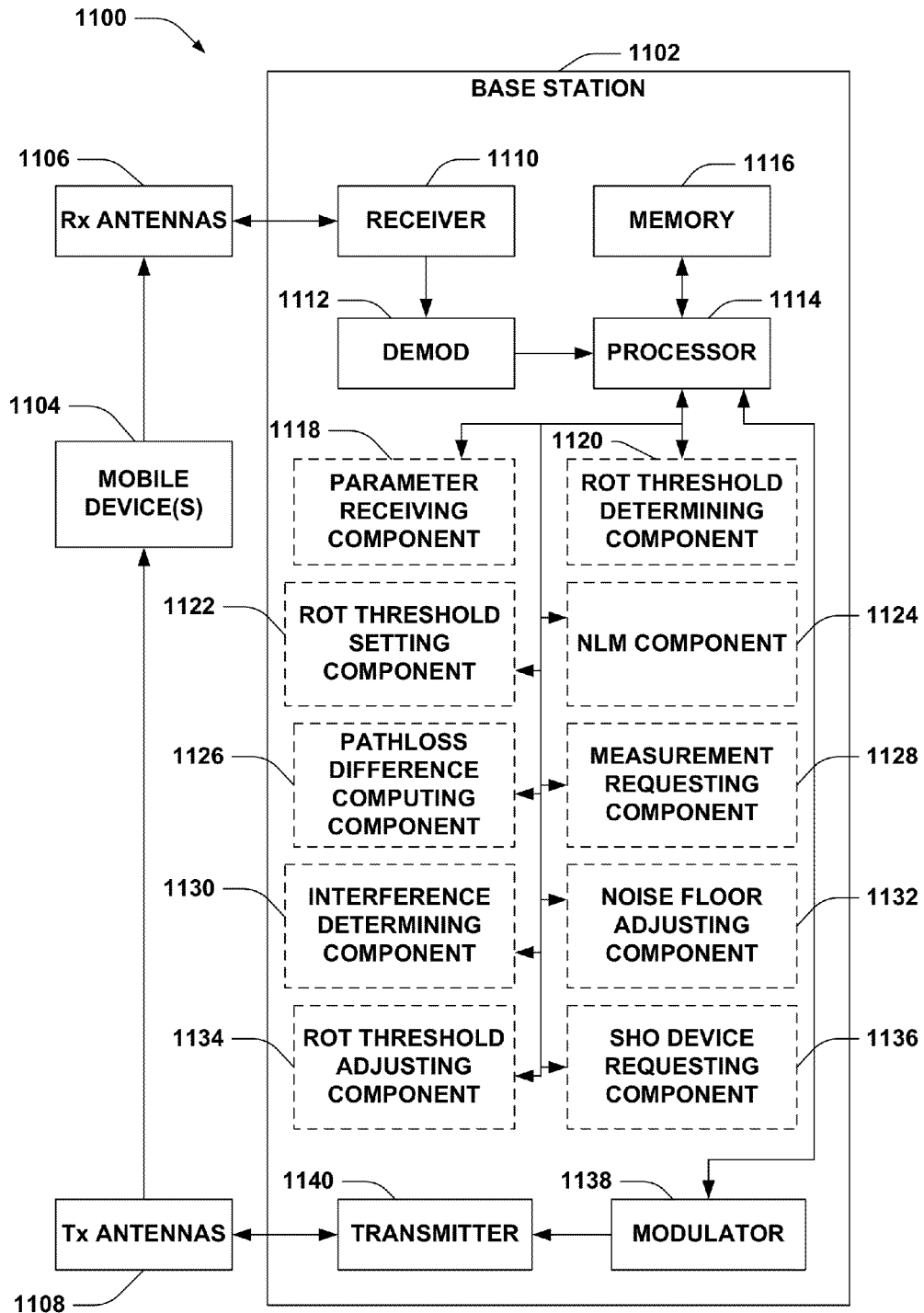
FIG. 11 is a block diagram of an example system for adjusting one or more parameters of an access point.

FIG. 11 is an illustration of a system 1100 that facilitates communicating with one or more devices using wireless communications. System 1100 comprises a base station 1102, which can be substantially any base station (e.g., a small base station, such as a femtocell, picocell, etc., mobile base station . . . ), a relay, etc., having a receiver 1110 that receives signal(s) from one or more mobile devices 1104 through a plurality of receive antennas 1106 (e.g., which can be of multiple network technologies, as described), and a transmitter 1140 that transmits to the one or more mobile devices 1104 through a plurality of transmit antennas 1108 (e.g., which can be of multiple network technologies, as described). In addition, in one example, transmitter 1140 can transmit to the mobile devices 1104 over a wired front link. Receiver 1110 can receive information from one or more receive antennas 1106 and is operatively associated with a demodulator 1112 that demodulates received information. In addition, in an example, receiver 1110 can receive from a wired backhaul link. Demodulated symbols are analyzed by a processor 1114 that can be similar to the processor described above with regard to FIG. 10, and which is coupled to a memory 1116 that stores information related to estimating a signal (e.g., pilot) strength and/or interference strength, data to be transmitted to or received from mobile device(s) 1104 (or a disparate base station (not shown)), and/or any other suitable information related to performing the various actions and functions set forth herein.

Processor 1114 is further optionally coupled to a parameter receiving component 1118, which can be similar to parameter receiving component 212, a RoT threshold determining component 1120, which can be similar to a RoT threshold determining component 214, a RoT threshold setting component 1122, which can be similar to RoT threshold setting component 216, a NLM component 1124, which can be similar to NLM components 218 and/or 408, a pathloss difference component 1126, which can be similar to pathloss difference computing component 220, and/or a measurement requesting component 1128, which can be similar to measurement requesting component 308. Moreover, for example, processor 1114 can also optionally be coupled to an interference determining component 1130, which can be similar to interference determining component 410, a noise floor adjusting component 1132, which can be similar to noise floor adjusting component 412, a RoT threshold adjusting component 1134, which can be similar to RoT threshold adjusting component 414, and/or a SHO device requesting component 1136, which can be similar to SHO device requesting component 416.

Moreover, for example, processor 1114 can modulate signals to be transmitted using modulator 1138, and transmit modulated signals using transmitter 1140. Transmitter 1140 can transmit signals to mobile devices 1104 over Tx antennas 1108. Furthermore, although depicted as being separate from the processor 1114, it is to be appreciated that the parameter receiving component 1118, RoT threshold determining component 1120, RoT threshold setting component 1122, NLM component 1124, pathloss difference computing component 1126, measurement requesting component 1128, interference determining component 1130, noise floor adjusting component 1132, RoT threshold adjusting component 1134, SHO device requesting component 1136, demodulator 1112, and/or modulator 1138 can be part of the processor 1114 or multiple processors (not shown), and/or stored as instructions in memory 1116 for execution by processor 1114.

Figure 12:
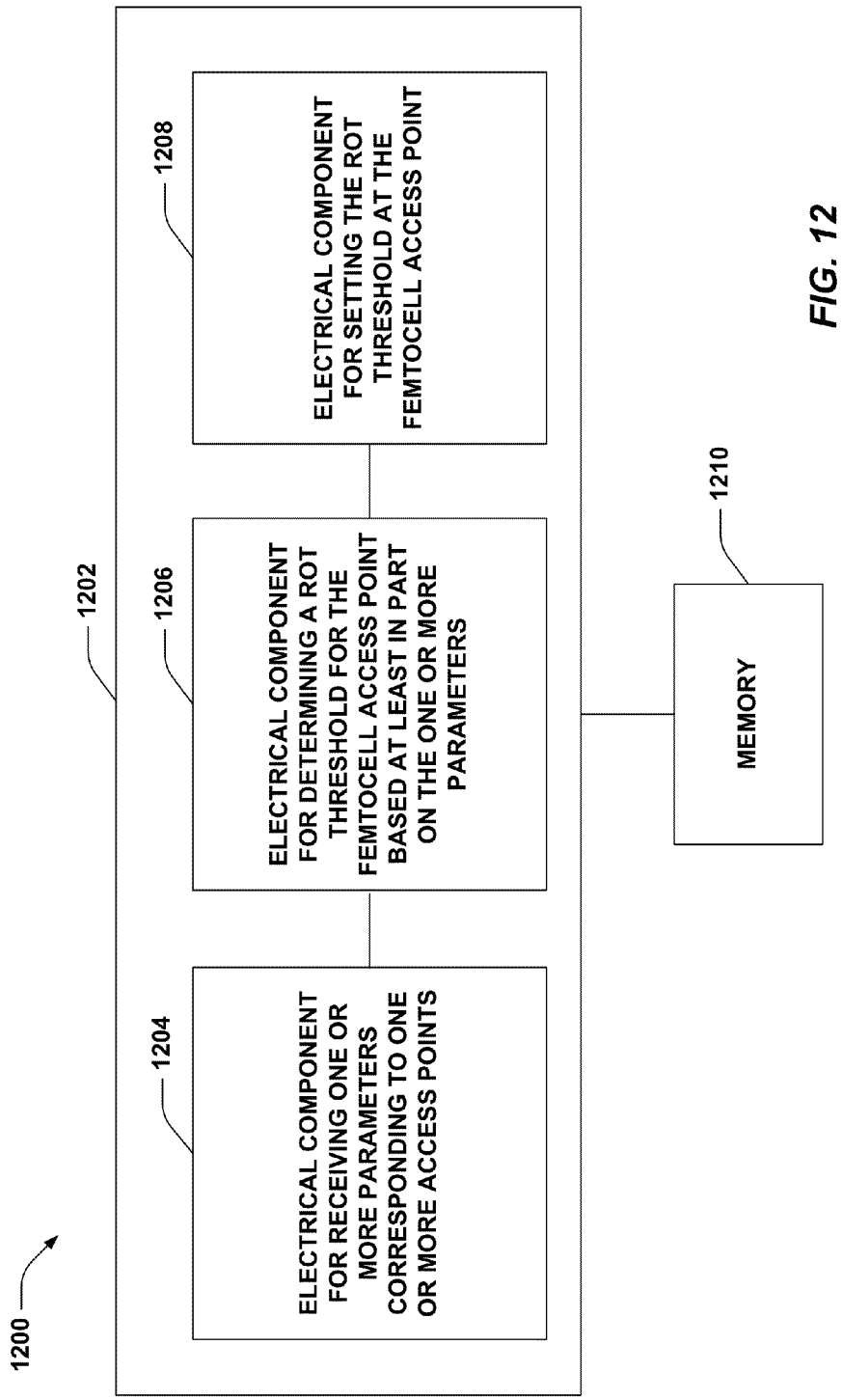
FIG. 12 is a block diagram of an example system that determines a RoT threshold for an access point.

With reference to FIG. 12, illustrated is a system 1200 that determines a RoT threshold. For example, system 1200 can reside at least partially within an access point, etc. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for receiving one or more parameters corresponding to the one or more access points 1204. As described, for example, the one or more parameters can correspond to pathloss measurements to the one or more access points, a location of the one or more access points (e.g., absolute or relative to the femtocell access point or other points of reference), etc.

Further, logical grouping 1202 can comprise an electrical component for determining a RoT threshold for the femtocell access point based at least in part on the one or more parameters 1206. For example, the RoT threshold can be determined to mitigate interference to the one or more devices, as described above. Moreover, logical grouping 1202 can comprise an electrical component for setting the RoT threshold at the femtocell access point 1208. As described for example, this can cause devices communicating with the femtocell access point to decrease transmission power, which can mitigate interference caused to one or more other access points. In an example, electrical component 1204 can comprise a parameter receiving component 212, as described. For example, electrical component 1206 can include a RoT threshold determining component 214, as described above. In addition, for example, electrical component 1208, in an aspect, can include a RoT threshold setting component 216, as described above.

Additionally, system 1200 can include a memory 1210 that retains instructions for executing functions associated with the electrical components 1204, 1206, and 1208. While shown as being external to memory 1210, it is to be understood that one or more of the electrical components 1204, 1206, and 1208 can exist within memory 1210. In one example, electrical components 1204, 1206, and 1208 can comprise at least one processor, or each electrical component 1204, 1206, and 1208 can be a corresponding module of at least one processor. Moreover, in an additional or alternative example, electrical components 1204, 1206, and 1208 can be a computer program product comprising a computer readable medium, where each electrical component 1204, 1206, and 1208 can be corresponding code.

Figure 13:
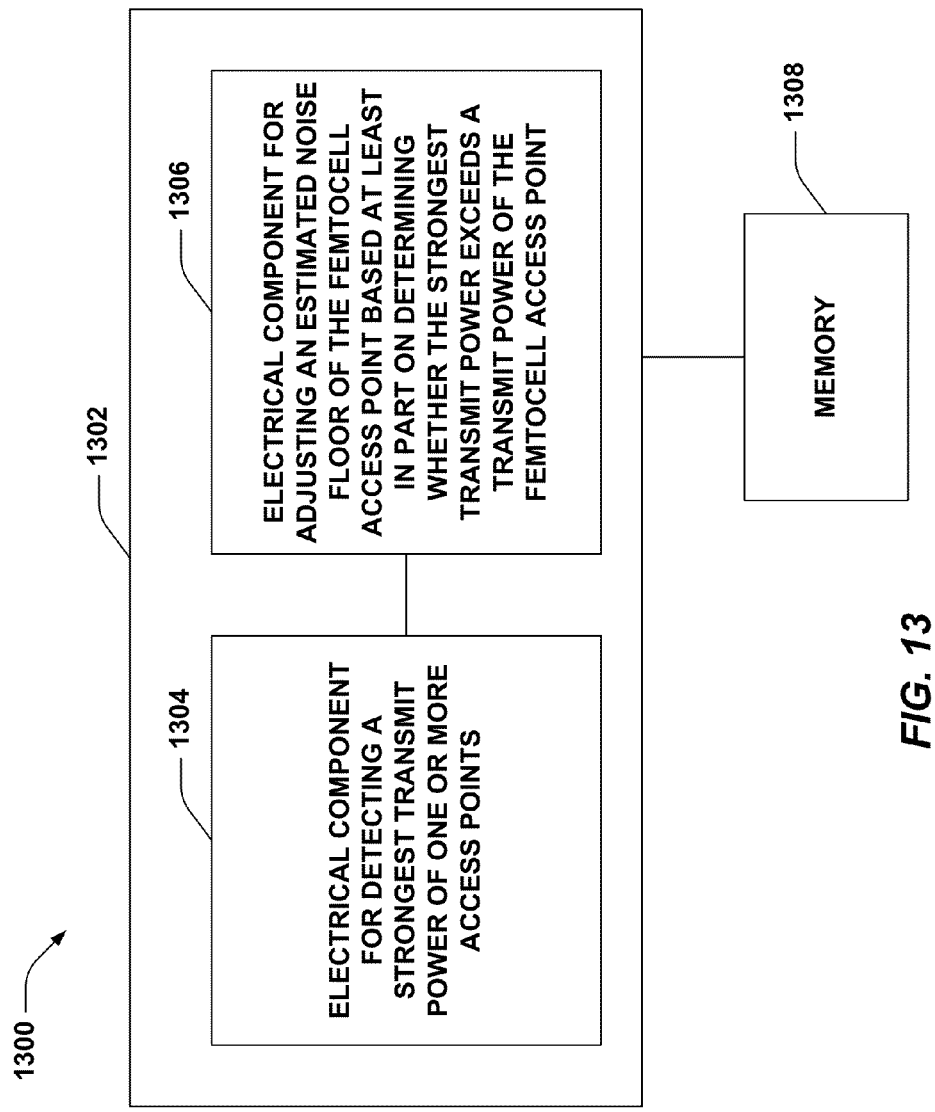
FIG. 13 is a block diagram of an example system that enforces estimated noise floor for devices in soft handover.

With reference to FIG. 13, illustrated is a system 1300 that adjusts one or more parameters of a femtocell access point to mitigate interference. For example, system 1300 can reside at least partially within a device, etc. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for detecting a strongest transmit power of one or more access points 1304. As described, for example, this can include receiving signals from one or more neighboring access points and determining a strongest of the signals.

Further, logical grouping 1302 can comprise an electrical component for adjusting an estimated noise floor of the femtocell access point based at least in part on determining whether the strongest transmit power exceeds the transmit power of the femtocell access point 1306. As described for example, electrical component 1306 can set the noise floor to the difference in the transmit powers. For example, electrical component 1304 can include a interference determining component 410, as described above. In addition, for example, electrical component 1306, in an aspect, can include a noise floor adjusting component 412, as described above.

Additionally, system 1300 can include a memory 1308 that retains instructions for executing functions associated with the electrical components 1304 and 1306. While shown as being external to memory 1308, it is to be understood that one or more of the electrical components 1304 and 1306 can exist within memory 1308. In one example, electrical components 1304 and 1306 can comprise at least one processor, or each electrical component 1304 and 1306 can be a corresponding module of at least one processor. Moreover, in an additional or alternative example, electrical components 1304 and 1306 can be a computer program product comprising a computer readable medium, where each electrical component 1304 and 1306 can be corresponding code.

Figure 14:
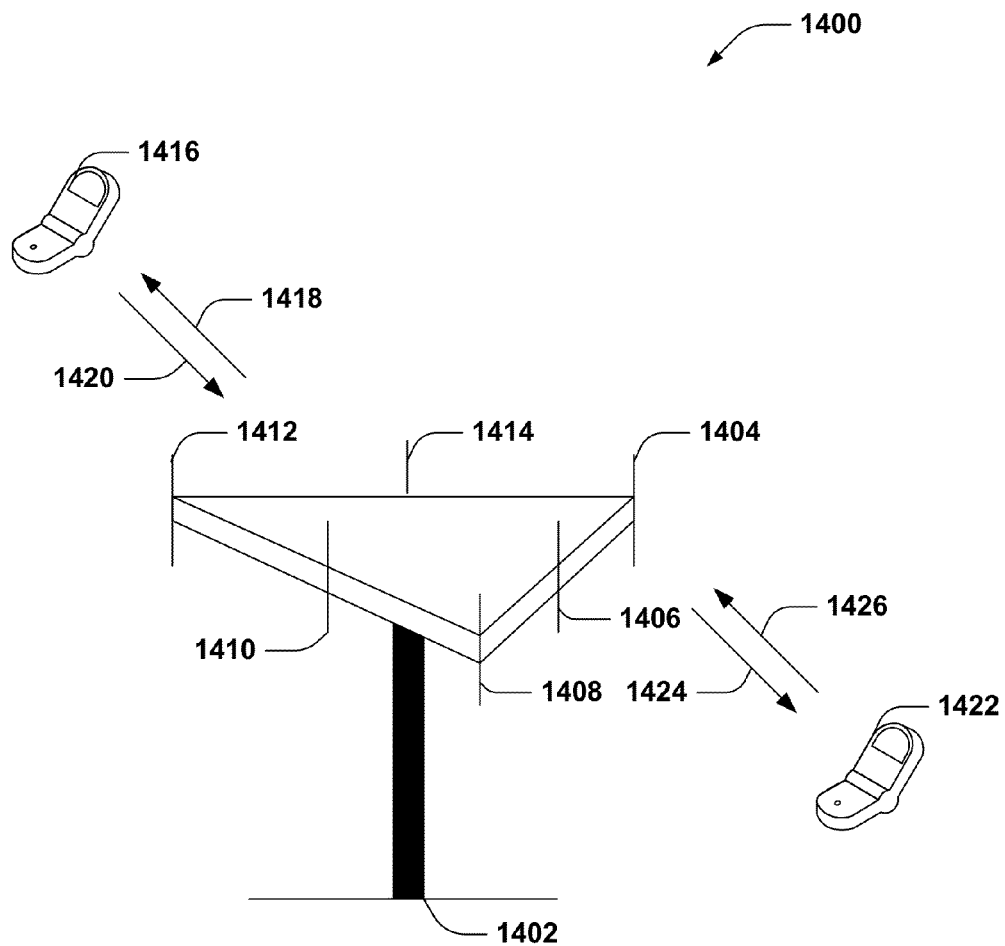
FIG. 14 is a block diagram of an example wireless communication system in accordance with various aspects set forth herein.

Referring now to FIG. 14, a wireless communication system 1400 is illustrated in accordance with various embodiments presented herein. System 1400 comprises a base station 1402 that can include multiple antenna groups. For example, one antenna group can include antennas 1404 and 1406, another group can comprise antennas 1408 and 1410, and an additional group can include antennas 1412 and 1414. Two antennas are illustrated for each antenna group; however, more or fewer antennas can be utilized for each group. Base station 1402 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1402 can communicate with one or more mobile devices such as mobile device 1416 and mobile device 1422; however, it is to be appreciated that base station 1402 can communicate with substantially any number of mobile devices similar to mobile devices 1416 and 1422. Mobile devices 1416 and 1422 can be, for example, cellular phones, smart phones, laptops, handheld communication devices, handheld computing devices, satellite radios, global positioning systems, PDAs, and/or any other suitable device for communicating over wireless communication system 1400. As depicted, mobile device 1416 is in communication with antennas 1412 and 1414, where antennas 1412 and 1414 transmit information to mobile device 1416 over a forward link 1418 and receive information from mobile device 1416 over a reverse link 1420. Moreover, mobile device 1422 is in communication with antennas 1404 and 1406, where antennas 1404 and 1406 transmit information to mobile device 1422 over a forward link 1424 and receive information from mobile device 1422 over a reverse link 1426. In a frequency division duplex (FDD) system, forward link 1418 can utilize a different frequency band than that used by reverse link 1420, and forward link 1424 can employ a different frequency band than that employed by reverse link 1426, for example. Further, in a time division duplex (TDD) system, forward link 1418 and reverse link 1420 can utilize a common frequency band and forward link 1424 and reverse link 1426 can utilize a common frequency band.

Each group of antennas and/or the area in which they are designated to communicate can be referred to as a sector of base station 1402. For example, antenna groups can be designed to communicate to mobile devices in a sector of the areas covered by base station 1402. In communication over forward links 1418 and 1424, the transmitting antennas of base station 1402 can utilize beamforming to improve signal-to-noise ratio of forward links 1418 and 1424 for mobile devices 1416 and 1422. Also, while base station 1402 utilizes beamforming to transmit to mobile devices 1416 and 1422 scattered randomly through an associated coverage, mobile devices in neighboring cells can be subject to less interference as compared to a base station transmitting through a single antenna to all its mobile devices. Moreover, mobile devices 1416 and 1422 can communicate directly with one another using a peer-to-peer or ad hoc technology as depicted. According to an example, system 1400 can be a multiple-input multiple-output (MIMO) communication system. In addition, for example, base station 1402 can set a RoT threshold, noise floor, or other parameters so as not to interfere with other access points (not shown) based on one or more pathloss measurements to one or more access points, detected out-of-cell interference, etc., as described.

Figure 15:
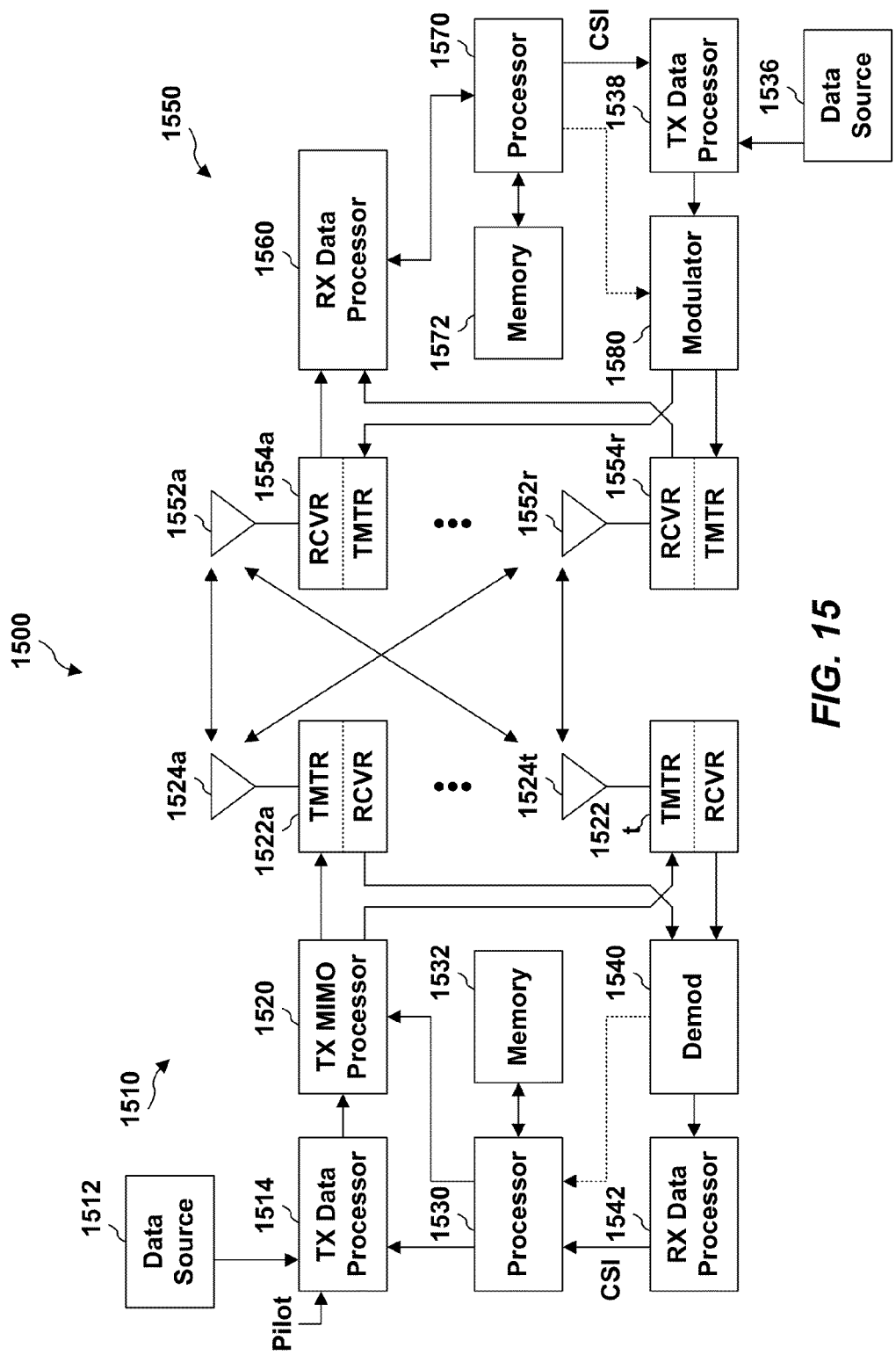
FIG. 15 is an illustration of an example wireless network environment that can be employed in conjunction with the various systems and methods described herein.

FIG. 15 shows an example wireless communication system 1500. The wireless communication system 1500 depicts one base station 1510 and one mobile device 1550 for sake of brevity. However, it is to be appreciated that system 1500 can include more than one base station and/or more than one mobile device, wherein additional base stations and/or mobile devices can be substantially similar or different from example base station 1510 and mobile device 1550 described below. In addition, it is to be appreciated that base station 1510 and/or mobile device 1550 can employ the systems (FIGS. 1-4 and 11-14), mobile devices, (FIG. 10), and/or methods (FIGS. 5-9) described herein to facilitate wireless communication there between. For example, components or functions of the systems and/or methods described herein can be part of a memory 1532 and/or 1572 or processors 1530 and/or 1570 described below, and/or can be executed by processors 1530 and/or 1570 to perform the disclosed functions.

At base station 1510, traffic data for a number of data streams is provided from a data source 1512 to a transmit (TX) data processor 1514. According to an example, each data stream can be transmitted over a respective antenna. TX data processor 1514 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1550 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1530.

The modulation symbols for the data streams can be provided to a TX MIMO processor 1520, which can further process the modulation symbols (e.g., for OFDM). TX MIMO processor 1520 then provides $N_T$ modulation symbol streams to $N_T$ transmitters (TMTR) 1522a through 1522t. In various embodiments, TX MIMO processor 1520 applies beamforming weights to the symbols of the data streams and to the antenna from which the symbol is being transmitted.

Each transmitter 1522 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1522a through 1522t are transmitted from $N_T$ antennas 1524a through 1524t, respectively.

At mobile device 1550, the transmitted modulated signals are received by $N_R$ antennas 1552a through 1552r and the received signal from each antenna 1552 is provided to a respective receiver (RCVR) 1554a through 1554r. Each receiver 1554 conditions (e.g., filters, amplifies, and downconverts) a respective signal, digitizes the conditioned signal to provide samples, and further processes the samples to provide a corresponding "received" symbol stream.

An RX data processor 1560 can receive and process the $N_R$ received symbol streams from $N_R$ receivers 1554 based on a particular receiver processing technique to provide $N_T$ "detected" symbol streams. RX data processor 1560 can demodulate, deinterleave, and decode each detected symbol stream to recover the traffic data for the data stream. The processing by RX data processor 1560 is complementary to that performed by TX MIMO processor 1520 and TX data processor 1514 at base station 1510.

The reverse link message can comprise various types of information regarding the communication link and/or the received data stream. The reverse link message can be processed by a TX data processor 1538, which also receives traffic data for a number of data streams from a data source 1536, modulated by a modulator 1580, conditioned by transmitters 1554a through 1554r, and transmitted back to base station 1510.

At base station 1510, the modulated signals from mobile device 1550 are received by antennas 1524, conditioned by receivers 1522, demodulated by a demodulator 1540, and processed by a RX data processor 1542 to extract the reverse link message transmitted by mobile device 1550. Further, processor 1530 can process the extracted message to determine which precoding matrix to use for determining the beamforming weights.

Processors 1530 and 1570 can direct (e.g., control, coordinate, manage, etc.) operation at base station 1510 and mobile device 1550, respectively. Respective processors 1530 and 1570 can be associated with memory 1532 and 1572 that store program codes and data. Processors 1530 and 1570 can determine RoT thresholds, noise floor adjustments, pathloss measurements, and/or the like, as described.

Figure 16:
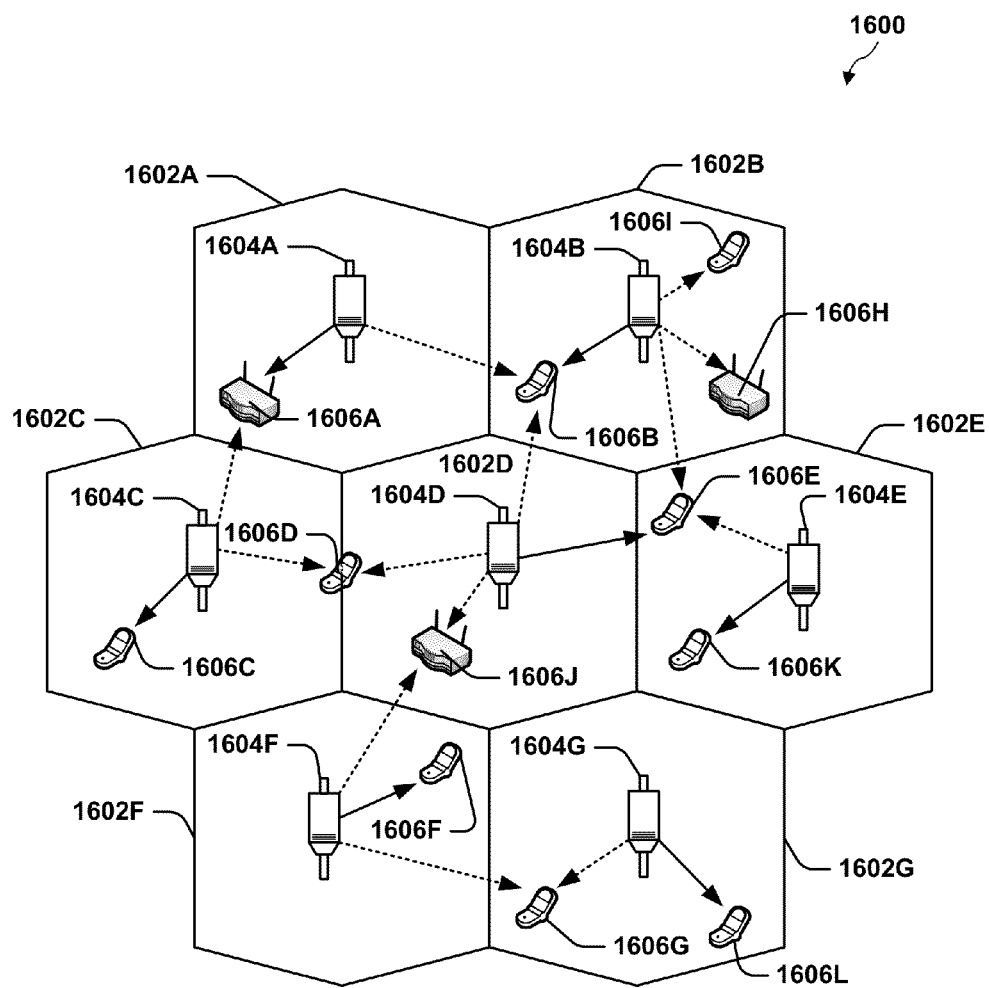
FIG. 16 illustrates an example wireless communication system, configured to support a number of devices, in which the aspects herein can be implemented.

FIG. 16 illustrates a wireless communication system 1600, configured to support a number of users, in which the teachings herein may be implemented. The system 1600 provides communication for multiple cells 1602, such as, for example, macro cells 1602A-1602G, with each cell being serviced by a corresponding access node 1604 (e.g., access nodes 1604A-1604G). As shown in FIG. 16, access terminals 1606 (e.g., access terminals 1606A-1606L) can be dispersed at various locations throughout the system over time. Each access terminal 1606 can communicate with one or more access nodes 1604 on a forward link (FL) and/or a reverse link (RL) at a given moment, depending upon whether the access terminal 1606 is active and whether it is in soft handoff, for example. The wireless communication system 1600 can provide service over a large geographic region.

Figure 17:
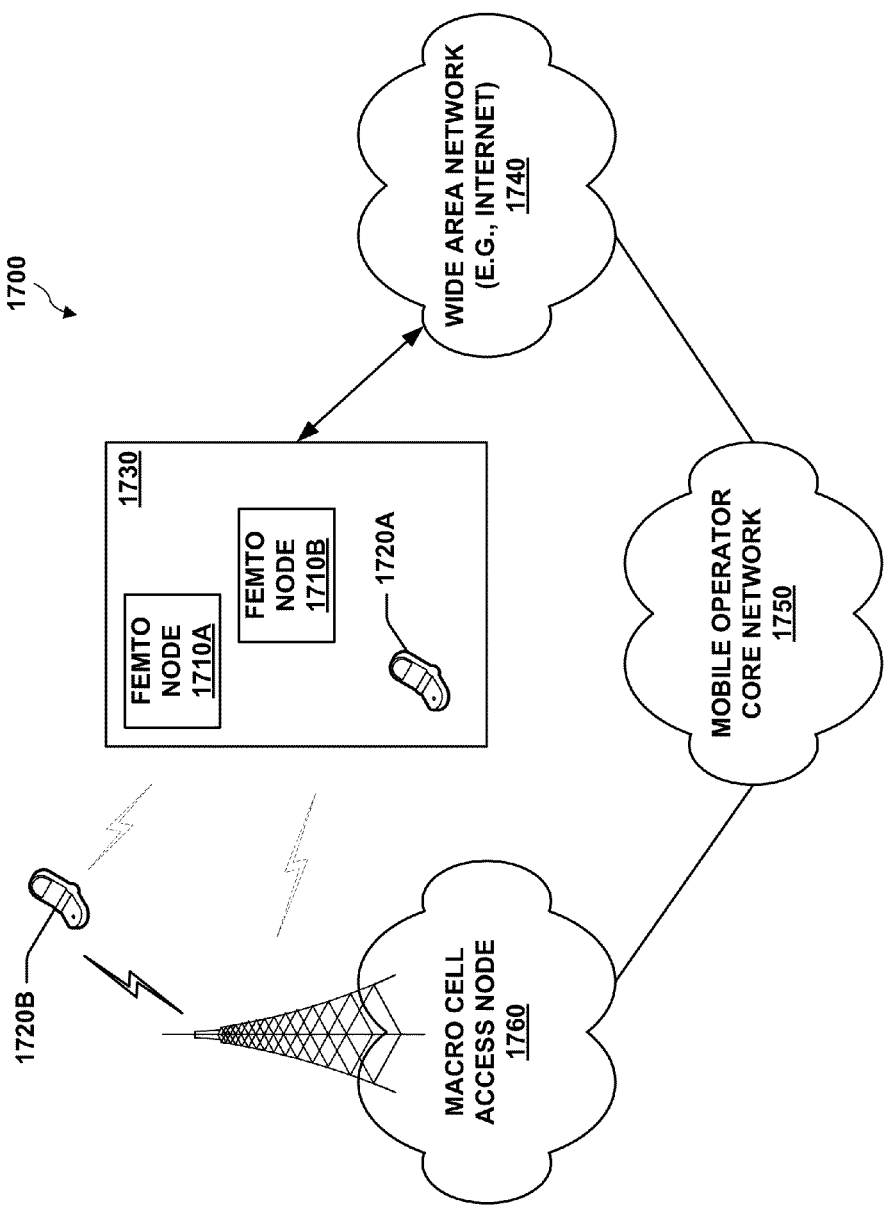
FIG. 17 is an illustration of an exemplary communication system to enable deployment of femtocells within a network environment.

FIG. 17 illustrates an exemplary communication system 1700 where one or more femto nodes are deployed within a network environment. Specifically, the system 1700 includes multiple femto nodes 1710A and 1710B (e.g., femtocell nodes or H(e)NB) installed in a relatively small scale network environment (e.g., in one or more user residences 1730). Each femto node 1710 can be coupled to a wide area network 1740 (e.g., the Internet) and a mobile operator core network 1750 via a digital subscriber line (DSL) router, a cable modem, a wireless link, or other connectivity means (not shown). As will be discussed below, each femto node 1710 can be configured to serve associated access terminals 1720 (e.g., access terminal 1720A) and, optionally, alien access terminals 1720 (e.g., access terminal 1720B). In other words, access to femto nodes 1710 can be restricted such that a given access terminal 1720 can be served by a set of designated (e.g., home) femto node(s) 1710 but may not be served by any non-designated femto nodes 1710 (e.g., a neighbor's femto node).

Figure 18:
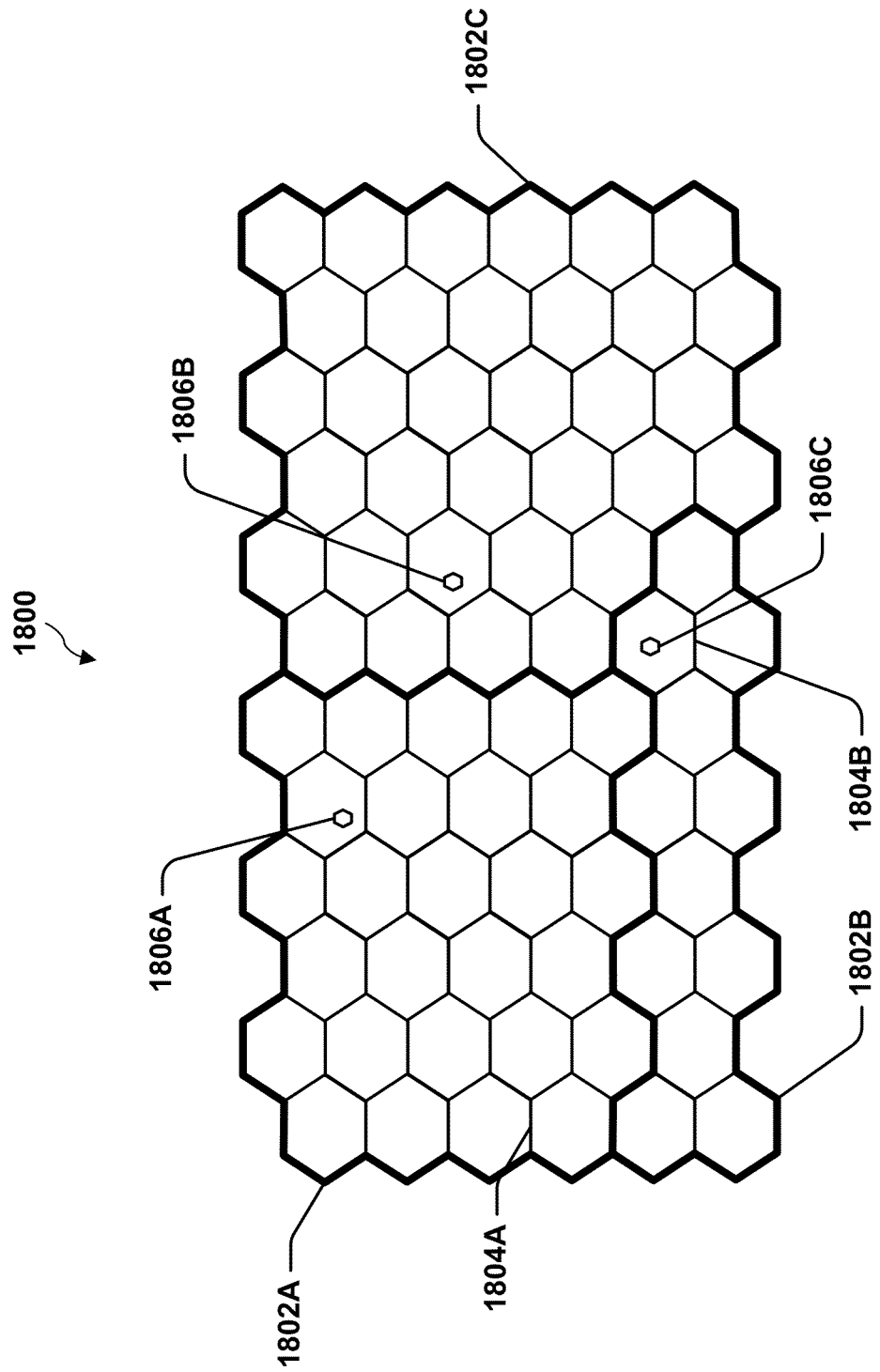
FIG. 18 illustrates an example of a coverage map having several defined tracking areas.

FIG. 18 illustrates an example of a coverage map 1800 where several tracking areas 1802 (or routing areas or location areas) are defined, each of which includes several macro coverage areas 1804. Here, areas of coverage associated with tracking areas 1802A, 1802B, and 1802C are delineated by the wide lines and the macro coverage areas 1804 are represented by the hexagons. The tracking areas 1802 also include femto coverage areas 1806. In this example, each of the femto coverage areas 1806 (e.g., femto coverage area 1806C) is depicted within a macro coverage area 1804 (e.g., macro coverage area 1804B). It should be appreciated, however, that a femto coverage area 1806 may not lie entirely within a macro coverage area 1804. In practice, a large number of femto coverage areas 1806 can be defined with a given tracking area 1802 or macro coverage area 1804. Also, one or more pico coverage areas (not shown) can be defined within a given tracking area 1802 or macro coverage area 1804.

Referring again to FIG. 17, the owner of a femto node 1710 can subscribe to mobile service, such as, for example, 3G mobile service, offered through the mobile operator core network 1750. In addition, an access terminal 1720 can be capable of operating both in macro environments and in smaller scale (e.g., residential) network environments. Thus, for example, depending on the current location of the access terminal 1720, the access terminal 1720 can be served by an access node 1760 or by any one of a set of femto nodes 1710 (e.g., the femto nodes 1710A and 1710B that reside within a corresponding user residence 1730). For example, when a subscriber is outside his home, he is served by a standard macro cell access node (e.g., node 1760) and when the subscriber is at home, he is served by a femto node (e.g., node 1710A). Here, it should be appreciated that a femto node 1710 can be backward compatible with existing access terminals 1720.

A femto node 1710 can be deployed on a single frequency or, in the alternative, on multiple frequencies. Depending on the particular configuration, the single frequency or one or more of the multiple frequencies can overlap with one or more frequencies used by a macro cell access node (e.g., node 1760). In some aspects, an access terminal 1720 can be configured to connect to a preferred femto node (e.g., the home femto node of the access terminal 1720) whenever such connectivity is possible. For example, whenever the access terminal 1720 is within the user's residence 1730, it can communicate with the home femto node 1710.

In some aspects, if the access terminal 1720 operates within the mobile operator core network 1750 but is not residing on its most preferred network (e.g., as defined in a preferred roaming list), the access terminal 1720 can continue to search for the most preferred network (e.g., femto node 1710) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 1720 can limit the search for specific band and channel. For example, the search for the most preferred system can be repeated periodically. Upon discovery of a preferred femto node, such as femto node 1710, the access terminal 1720 selects the femto node 1710 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 1710 that reside within the corresponding user residence 1730). In some implementations, a femto node can be restricted to not provide, for at least one access terminal, at least one of: signaling, data access, registration, paging, or service.

In some aspects, a restricted femto node (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on, except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for setting a rise-over-thermal (RoT) threshold for a femtocell access point, comprising:
   receiving one or more parameters corresponding to one or more access points, wherein the receiving the one or more parameters comprises obtaining a first pathloss measurement of at least one device to the femtocell access point, and obtaining a second pathloss measurement of the at least one device to a second access point;
   constructing a function of a difference between the first pathloss measurement and the second pathloss measurement;
   determining a RoT threshold for the femtocell access point based at least in part on the one or more parameters and the function of the difference between the first pathloss measurement and the second pathloss measurement; and
   setting the RoT threshold at the femtocell access point.

2. The method of claim 1, wherein the receiving the one or more parameters comprises obtaining additional first pathloss measurements from at least another device to the femtocell access point, and obtaining additional second pathloss measurements from the at least another device to the second access point, and wherein the determining the RoT threshold is further based at least in part on a function of a difference between the additional first pathloss measurements and the additional second pathloss measurements.

3. The method of claim 1, wherein the receiving the one or more parameters further comprises obtaining one or more additional pathloss measurements of the at least one device to one or more additional access points, and wherein the determining the RoT is based at least in part on a function of a difference between the first pathloss measurement and a minimum of the second pathloss measurement and the one or more additional pathloss measurements.

4. The method of claim 1, wherein the at least one device is a network listening module co-located within the femtocell access point.

5. The method of claim 1, further comprising configuring the at least one device to report at least the first pathloss measurement and the second pathloss measurement as part of a training period.

6. The method of claim 1, further comprising:
   determining a maximum transmit power for devices communicating with the femtocell access point; and
   determining another RoT threshold based at least in part on the maximum transmit power.

7. The method of claim 6, wherein the setting the RoT threshold comprises setting the RoT threshold as a minimum of the RoT threshold and the another RoT threshold.

8. The method of claim 1, wherein the receiving the one or more parameters comprises receiving a location of the femtocell access point within a macrocell, and the determining the RoT threshold is based at least in part on a distance computed between the femtocell access point and one or more other access points within the macrocell.

9. An apparatus for setting a rise-over-thermal (RoT) threshold for a femtocell access point, comprising:
   at least one processor configured to:
     receive one or more parameters corresponding to one or more access points, wherein the one or more parameters comprise a first pathloss measurement of at least one device to the femtocell access point, and a second pathloss measurement of the at least one device to a second access point;
     construct a function of difference between the first pathloss measurement and the second pathloss measurement;
     determine a RoT threshold for the femtocell access point based at least in part on the one or more parameters and the function of the difference between the first pathloss measurement and the second pathloss measurement; and
     set the RoT threshold at the femtocell access point; and
   a memory coupled to the at least one processor.

10. The apparatus of claim 9, wherein the one or more parameters comprise an additional first pathloss measurements from at least another device to the femtocell access point, and an additional second pathloss measurements from the at least another device to the second access point, and wherein the at least one processor determines the RoT threshold further based at least in part on a function of a difference between the additional first pathloss measurements and the additional second pathloss measurements.

11. The apparatus of claim 9, wherein the at least one processor is further configured to obtain one or more additional pathloss measurements of the at least one device to one or more additional access points, and wherein the one or more parameters comprise the one or more additional pathloss measurements.

12. The apparatus of claim 9, wherein the at least one device is a network listening module co-located at the femtocell access point.

13. An apparatus for setting a rise-over-thermal (RoT) threshold for a femtocell access point, comprising:
   means for receiving one or more parameters corresponding to one or more access points, wherein the one or more parameters comprise a first pathloss measurement of at least one device to the femtocell access point and a second pathloss measurement of the at least one device to a second access point;

means for constructing a function of a difference between the first pathloss measurement and the second pathloss measurement;

means for determining a RoT threshold for the femtocell access point based at least in part on the one or more parameters and the function of the difference between the first pathloss measurement and the second pathloss measurement; and means for setting the RoT threshold at the femtocell access point.

14. The apparatus of claim 13, wherein the one or more parameters comprise an additional first pathloss measurements from at least another device to the femtocell access point, and an additional second pathloss measurements from the at least another device to the second access point, and wherein the means for determining determines the RoT threshold further based at least in part on a function of a difference between the additional first pathloss measurements and the additional second pathloss measurements.

15. The apparatus of claim 13, wherein the means for receiving further obtains one or more additional pathloss measurements of the at least one device to one or more additional femtocell access points, wherein the one or more parameters further comprise the one or more additional pathloss measurements.

16. The apparatus of claim 13, further comprising means for processing one or more signals from the first or the second access point, wherein the at least one device comprises the means for processing.

17. A computer program product for setting a rise-over-thermal (RoT) threshold for a femtocell access point, comprising:

a non-transitory computer-readable medium, comprising:

code for causing at least one computer to receive one or more parameters corresponding to one or more access points, wherein the one or more parameters comprise a first pathloss measurement of at least one device to the femtocell access point, and a second pathloss measurement of the at least one device to a second access point;

code for causing the at least one computer to construct a function of a difference between the first pathloss measurement and the second pathloss measurement;

code for causing the at least one computer to determine a RoT threshold for the femtocell access point based at least in part on the one or more parameters and the function of the difference between the first pathloss measurement and the second pathloss measurement; and code for causing the at least one computer to set the RoT threshold at the femtocell access point.

18. The computer program product of claim 17, wherein the one or more parameters comprise an additional first pathloss measurements from at least another device to the femtocell access point, and an additional second pathloss measurements from the at least another device to the second access point, and wherein the code for causing the at least one computer to determine determines the RoT threshold further based at least in part on a function of a difference between the additional first pathloss measurements and the additional second pathloss measurements.

19. The computer program product of claim 17, wherein the computer-readable medium further comprises code for causing the at least one computer to obtain one or more additional pathloss measurements of the at least one device to one or more additional access points, and wherein the one or more parameters comprise the one or more additional pathloss measurements.

20. The computer program product of claim 17, wherein the at least one device is a network listening module co-located at the femtocell access point.

21. An apparatus for setting a rise-over-thermal (ROT) threshold for a femtocell access point, comprising:

a processor;

a parameter receiving component in communication with the processor for receiving one or more parameters corresponding to one or more access points wherein the one or more parameters comprise a first pathloss measurement of at least one device to the femtocell access point and a second pathloss measurement of the at least one device to a second access point, wherein the one or more parameters comprise the first pathloss measurement and the second pathloss measurement;

a ROT threshold constructing component in communication with the processor for constructing a function of a difference between the first pathloss measurement and the second pathloss measurement;

a RoT threshold determining component in communication with the processor for determining a RoT threshold for the femtocell access point based at least in part on the one or more parameters and the function of the difference between the first pathloss measurement and the second pathloss measurement; and a RoT threshold setting component in communication with the processor for setting the RoT threshold at the femtocell access point.

22. The apparatus of claim 21, wherein the one or more parameters comprise an additional first pathloss measurements from at least another device to the femtocell access point, and an additional second pathloss measurements from the at least another device to the second access point, and wherein the RoT threshold determining component determines the RoT threshold further based at least in part on a function of a difference between the additional first pathloss measurements and the additional second pathloss measurements.

23. The apparatus of claim 21, wherein the parameter receiving component further obtains one or more additional pathloss measurements of the at least one device to one or more additional femtocell access points, wherein the one or more parameters further comprise the one or more additional pathloss measurements.

24. The apparatus of claim 21, further comprising a network listening module (NLM) component in communication with the processor for processing one or more signals from the first or the second access point, wherein the at least one device comprises the NLM component.

25. The apparatus of claim 21, further comprising a measurement requesting component in communication with the processor for configuring the at least one device to report at least the first pathloss measurement and the second pathloss measurement as part of a training period.

26. The apparatus of claim 21, wherein the parameter receiving component determines a maximum transmit power for devices communicating with the femtocell access point, wherein the RoT threshold determining component determines another RoT threshold based at least in part on the maximum transmit power.

27. The apparatus of claim 26, wherein the RoT threshold determining component determines the RoT threshold as a minimum of the RoT threshold and the another RoT threshold.

28. The apparatus of claim 21, wherein the one or more parameters comprise a location of the femtocell access point within a macrocell, and the RoT threshold determining component determines the RoT threshold based at least in part on a distance computed between the femtocell access point and one or more other access points within the macrocell.

* * * * *